United States Patent [19]
Hefner, Jr. et al.

[11] Patent Number: 5,491,201
[45] Date of Patent: Feb. 13, 1996

[54] MESOGENIC CYCLIC IMINO ETHER-CONTAINING COMPOSITIONS AND POLYMERIZATION PRODUCTS THEREOF

[75] Inventors: Robert E. Hefner, Jr.; Jimmy D. Earls, both of Lake Jackson, Tex.

[73] Assignee: The Dow Chemical Company, Midland, Mich.

[21] Appl. No.: 389,461

[22] Filed: Feb. 16, 1995

Related U.S. Application Data

[60] Continuation-in-part of Ser. No. 240,940, May 10, 1994, abandoned, which is a division of Ser. No. 119,852, Sep. 10, 1993, Pat. No. 5,338,828, which is a division of Ser. No. 832,070, Feb. 6, 1992, Pat. No. 5,281,675.

[51] Int. Cl.$^6$ ................................................ C07D 263/10
[52] U.S. Cl. .................... 525/420; 525/421; 525/426; 525/432; 525/437; 525/445; 525/451; 525/461; 525/462; 525/467; 525/468; 544/88; 544/96; 544/97; 544/359; 544/369; 544/387; 544/388; 548/229; 548/233; 548/234; 548/237; 548/238; 548/239
[58] Field of Search .................... 548/237, 229, 548/233, 234, 238, 239; 525/421, 426, 432, 420, 437, 445, 451, 462, 462, 467, 468, 461; 544/88, 96, 97, 359, 369, 387, 388

[56] References Cited

U.S. PATENT DOCUMENTS

| | | | |
|---|---|---|---|
| 3,630,996 | 12/1971 | Tomalia | 528/117 |
| 3,639,395 | 2/1972 | Tomalia | 548/238 |
| 3,730,915 | 5/1973 | Tomalia et al. | 528/118 |
| 3,763,177 | 10/1973 | Tomalia et al. | 548/238 |
| 3,784,508 | 1/1974 | Tomalia et al. | 528/117 |
| 3,822,237 | 7/1974 | Alford et al. | 528/73 |
| 4,430,491 | 2/1984 | Culbertson et al. | 528/153 |
| 4,605,746 | 8/1986 | Goel | 548/218 |
| 4,628,102 | 12/1986 | Goel | 548/218 |
| 4,652,620 | 3/1987 | Tufts et al. | 525/504 |
| 4,748,230 | 5/1988 | Tiba et al. | 528/211 |
| 4,843,143 | 6/1989 | Culbertson et al. | 528/211 |
| 4,940,771 | 7/1990 | Maresca | 528/199 |
| 4,962,163 | 12/1990 | Hefner, Jr. et al. | 525/463 |
| 5,024,785 | 6/1991 | Hefner, Jr. et al. | 252/299.01 |
| 5,159,084 | 10/1992 | Shoshi | 548/237 |

FOREIGN PATENT DOCUMENTS 0534258  3/1993  European Pat. Off.

OTHER PUBLICATIONS

Chemical Abstracts 74:111953, "Benzanthracenylphenyl–Z–Oxazolines", Vingiello et al, 1971.
Chemical Abstracts 94:193102, "Polyesters with High Degrees of Polymerization", 1980.
CA 59:12805e.
CA 71:50927m.
CA 112:37323q.
CA 112:159845g.
CA 112:160062f.
CA 114:218115k.
CA 115:72502f.
CA 115:257487y.
CA 115:115785v.
CA 115:72938c.
Derwent 89/102892/14.
"Synthesis and Characterization of Liquid Crystalline Poly(N–acylethyleneimine)s" by Jose M. Rodriquez–Parada et al, Journal of Polymer Science: Part A, Polymer Chemistry, 25, pp. 2269–2279 (1987).
"Syntheses from Ethanolamine. V. Synthesis of delta2–Oxazoline and of 2,2'–delta2–Dioxazoline" by Henry Wenker, Journal of the American Chemical Society, 60, pp. 2152–2153 (1938).
"Heterocyclization of Epimeric Aminocyclanols. I. Oxazolines" by Horswill et al, J. Am. Chem. Soc. 73, pp. 3744–3746 (1951).
"A Mild Conversion of Carboxylic Acids to 2–Oxazolines and their Utility as a Carboxyl masking Group Against LithiumAluminum Hydride" by Dan Haidukewych and A. I. Meyers, Tetrahedron Letters, 30, 3031–3134 (1972).
"Oxazolines. Their Preparation, Reactions, and Applications" by John A. Frump. Chemical Reviews, 71, 483–505 (1971).
"Cyclic Imino Ethers, Polymerization" in Encyclopedia of Polymer Science and Engineering, 4, 525–535 (1986).
"Poly(alkylenimine) Derivatives: A Variety of Possible Applications" in Polymer News, 16, 70–76 (1991).
"New Addition Reactions, III, Addition of Aliphatic Epoxides to Nitrites" by Ryohgei Oda et al, Bulletin of the Chemical Society of Japan, 35, 1219–1221 (1962).
"Aminophenyl–2–oxazolines as Local Anesthetics" by M. T. Leffler et al, Journal of Am. Chem. Soc., 59, 2252–2258 (1937).
"Aminophenol–2–pentoxazolines as Local Anestetics" by A. Novelli and Roger Adams, Journal of Am. Chem. Soc., 2259–2260 (1937).
"Synthesis of Oxazoline–2–thiols from 2–Aminoalcohols" by A. A. Rosen, Journal of the American Chemical Society, vol. 74, pp. 2994–2997.
"Synthesis of 2–Oxazoline–2–amines and 2–Thiazoline–2–amines by Reaction of Aziridinium Tetrafluoroborate with Isocyanates and Isothiocyanates" by Prot E. Pied et al, Angewandter Chemie, International Edition in English, 5, 667 (1966).
"The Cyclization of 1–(Hydroxyalky)guanidines and Nitroguanidines to Cyclicpseudoureas" by Lawrence Fishbein et al. Journal of Organic Chemistry, 23, 434–435 (1956).
"Uber die Antagerung von Epoxiden an cyclishe Iminoester" by Roland Feinauer et al, Justus Liebigs Annalen Chemie, 698, 174–179 (1966).
CA 66:37857y.

(List continued on next page.)

*Primary Examiner*—Frederick Krass

[57] ABSTRACT

Novel cyclic imino ether compositions containing one or more mesogenic moieties, when polymerized, result in products having improved properties.

3 Claims, No Drawings

OTHER PUBLICATIONS

"Preparation of a Crystalline Poly(ester–amide) by the Polyaddition Reaction of Bisoxazoline and a Dicarboxylic Acid" by Kagiya et al, Polymer Ltrs. 4, 257–260 (1966).

"Synthesis of Alternating Copolymers of Amidethioether by the Polyaddition Reaction of Bisoxazolines and Dithiols" by T. Nishikubo et al, Journal of Polymer Science, Polymer Ltr ed. 18, 761–764 (1980).

"Bisoxazoline–Phenolic Resin Low Flammability Composites for Aircraft Interiors" by Marvin L. Deviney et al, Polymer Preprints, v. 32, No. 2, pp. 282–283 (Jun. 1991).

"Electron–Rich Comonomeric Reactants and Bismaleimides" by D. M. Wilson et al, Polymer Preprints v. 28, No. 1, pp. 73–74 (Apr. 1987).

"Spontaneous Copolymerization of Electron–rich Comonomers and Malemides" by D. M. Wilson et al, Polymeric Materials Science and Engineering, 58, pp. 570–574 (1988).

"Spontaneous Reaction of 2–Substituted–2–oxazolines and Bismateimides" by Dennis M. Wilson et al Polymeric Materials Science and Engineering 60, pp. 88–92 (1989).

MESOGENIC CYCLIC IMINO ETHER-CONTAINING COMPOSITIONS AND POLYMERIZATION PRODUCTS THEREOF

CROSS-REFERENCE TO RELATED APPLICATIONS

This application is a continuation-in-part of application Ser. No. 08/240,940 filed May 10, 1994, now abandoned, which is a divisional application of application Ser. No. 08/119,852 filed Sep. 10, 1993, now U.S. Pat. No. 5,338,828, which is a divisional application of application Ser. No. 07/832,070 filed Feb. 6, 1992 (now U.S. Pat. No. 5,281,675) all of which are incorporated herein in their entirety.

FIELD OF THE INVENTION

The present invention concerns cyclic imino ether compositions containing one or more mesogenic moieties and polymerization products thereof.

BACKGROUND OF THE INVENTION

Mono, di and polyfunctional cyclic imino ether compounds and various polymerization products thereof are known, for example, from U.S. Pat. Nos. 1,958,529; 4,490,771; 3,630,996; 4,628,102; 4,605,746; 3,639,395: 3,763,177; 3,784,508; 3,822,237; 3,730,915; 4,652,620; 4,430,491; 4,484,143; 2,556,791; 2,504,951; 2,562,113; 3,402,178; 3,312,714; 3,268,544; 3,198,806; 3,247,220; 2,929,836; 3,108,114; 2,811,529; 2,889,351; 2,876,232; 3,432,600; 3,453,284; 3,161,650; 3,278,382; 2,831,858; 2,897,182; 3,248,397; 3,367,895; 2,569,428; 3,419,520; 2,252,200; 3,458,456; 3,438,943; 3,738,961, and 4,245,063. J. M. Rodriguez-Parada and V. Percec, Journal of Polymer Science, Part A: Polymer Chemistry, volume 25, number 8, pages 2269–2279 (1987) report on the polymerization of three monooxazolines containing a mesogenic moiety to produce poly(N-acylethylenimine)s. Said cyclic imino ethers produce a range of polymerization products which possess useful physical and mechanical properties, however, improvement in their properties, would be highly desireable.

The present invention provides a method for improving one or more of the physical and mechanical properties, such as thermal stability, glass transition temperature, chemical resistance, mechanical strength, and the like, by incorporation into the polymer structure one or more mesogenic moieties. Incorporation of said mesogenic moieties can lead to molecular level ordering of the polymers thereof. The present invention also provides for polymerizable mixtures containing one or more of the cyclic imino ether compositions containing one or more mesogenic moieties with, for example, one or more cyclic imino ether compositions which do not contain mesogenic moieties, epoxy resins, polymaleimides, polyamines, polyphenols or polythiophenols, polycarboxylic acids or polythiocarboxylic acids, compounds which simultaneously contain both a phenolic hydroxyl group or thiophenolic sulfhydryl group and an amino group, compounds which simultaneously contain both a phenolic hydroxyl or thiophenolic sulfhydryl group and a carboxylic acid or thiocarboxylic acid group, compounds which simultaneously contain both an amino group and a carboxylic acid or thiocarboxylic acid group in the same molecule and materials which contain one or more mesogenic moieties and an average of one cyclic imino ether group per molecule. The polymerized compositions prepared from the aforementioned polymerizable mixtures typically possess improvements in physical and mechanical properties relative to those polymerized compositions prepared using cyclic imino ether compositions which do not contain mesogenic moieties.

The term mesogen or mesogenic moiety as is used herein designates compositions containing one or more rigid rod-like structural units which have been found to favor the formation of liquid crystal phases in the case of low molar mass substances. Thus the mesogen or mesogenic moiety is that structure responsible for molecular ordering.

SUMMARY OF THE INVENTION

One aspect of the present invention pertains to a cyclic imino ether containing one or more rodlike mesogenic moieties and one or two terminal groups of the formula:

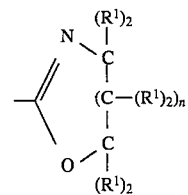

wherein $R^1$ is independently hydrogen or hydrocarbyl group having 1 to about 3 carbon atoms and n has a value of 0 or 1; said cyclic imino ether not including the following: 2-(4-(4-methoxy-4'-biphenyloxy)butyl)-2 -oxazoline, 2-(6-(4-methoxy-4'-methoxy- 4'biphenyloxy)butyl)-2-oxazoline, 2-(4-(4 -phenylphenoxy)butyl)-2-oxazoline, 2,2'-(1,1'-biphenyl)- 4,4'-diylbis(4,5-dihydro) oxazole or compounds represented by the following formula:

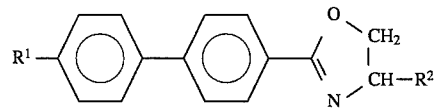

wherein $R^1$ represents an alkoxy group having not more than 20 carbon atoms and $R^2$ represents an alkyl group having from 1 to 8 carbon atoms, or said not included compounds which are substituted at one or more sites on their aromatic rings by hydrocarbyl of 1 to 10 carbons, hydrocarbyloxy of 1 to 10 carbons, a phenyl group, halogen, nitro, nitrile or —COR, where R is hydrogen or hydrocarbyl of 1 to 3 carbon atoms.

Another aspect of the present invention pertains to cyclic imino ether compositions containing one or more mesogenic moieties, particularly those represented by the following Formulas I, II, III or IV

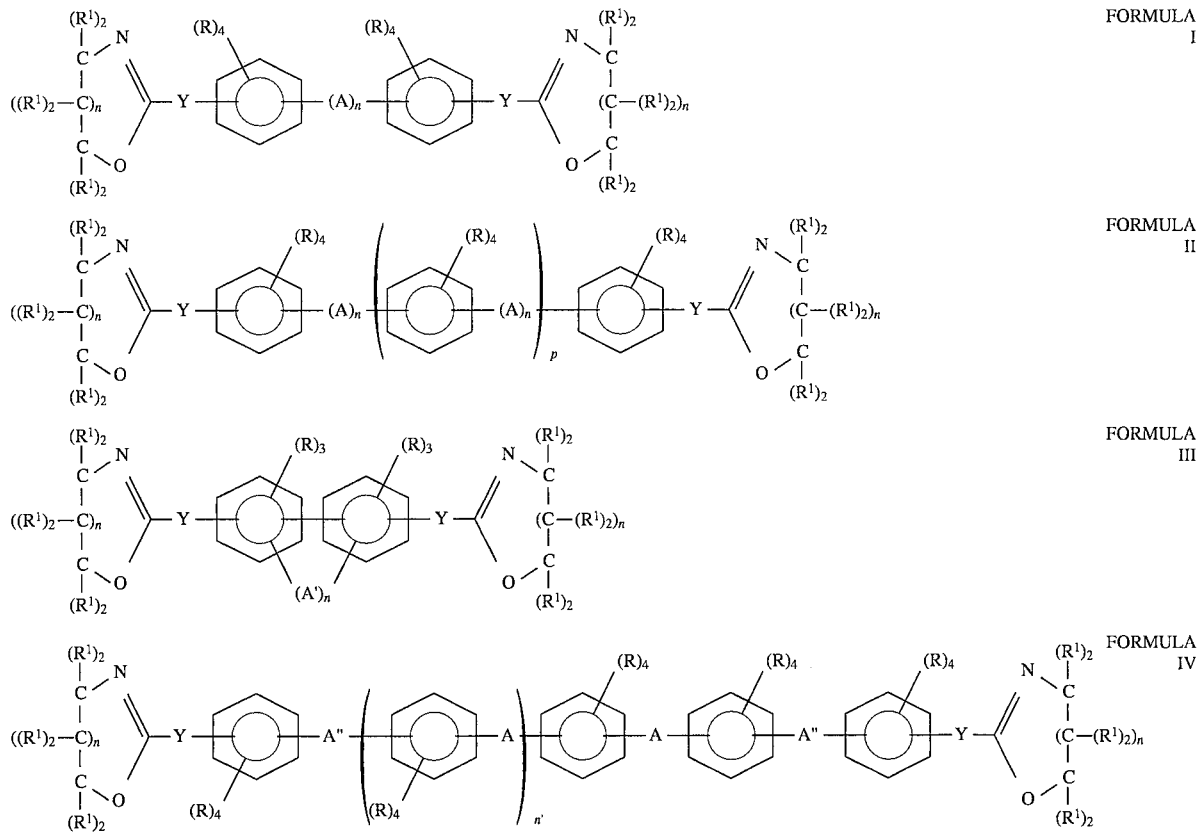

FORMULA I

FORMULA II

FORMULA III

FORMULA IV wherein at least about 80 percent of the —A— linkages, the direct bond in Formula III and the Y groups are in the para position with respect to each other; each Y is independently a direct bond, —CO—S—$(C(R^1)_2)_n{''}$—Im, —CO—NR$^1$—$(C(R^1)_2)_n{''}$—Im, —CO—O—$C(R^1)_2$—$(C(R^1)_2)_n{''}$—Im, —$(Q)_n$—$C(R^1)_2$—$(C(R^1)_2)_n{''}$—Im, —HN—CO—O—$C(R^1)_2$—$(C(R^1)_2)_n{''}$—Im, —$(Q)_n$—$C(R^1)_2$—$(C(R^1)_2)_n{''}$—(O—$C(R^1)_2$—$C(R^1)_2$—)$_P$—$(Q^1)_n$—, —O—$C(R^1)_2$—$(C(R^1)_2)_n{''}$—Im,

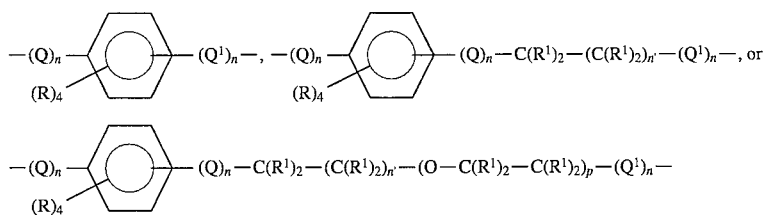

group;
each Q is independently a —O—CO—O—, —O—CO—, —CO—O—, —O—, —S—, —NR$^2$—, —CO—NR$^1$—, —NR$^1$—CO—, —NH—CO—NH—, —O—CO—NH—, —NH—CO—O—, —S—CO—, —CO—S—, —CO— group; each $Q^1$ is independently —CO—S—$(C(R^1)_2)_n{''}$—Im, —CO NR$^1$—$(C(R^1)_2)_n{''}$—Im, —CO—O—$C(R^1)_2$—$(C(R^1)_2)_n{''}$—Im, —NH—CO—O—$C(R^1)_2$—$(C(R^1)_2)_n{''}$—Im or —O—$C(R^1)_2$—$(C(R^1)_2)_n{''}$—Im each R$^2$ is independently a hydrocarbyl group having from to about 10, preferably from 1 to about 4, carbon atoms; each A is independently a direct bond, —CR$^1$=CR$^1$—, —C≡C—, —N=N—, —CR$^1$=N—, —O—CO—, —NR$^1$—CO—, —CR$^1$=N—N=CR$^1$—, —CR$^1$=CR$^1$—CO—, —CO—O—, —CO—NR$^1$—, —CO—CR$^1$=CR$^1$—, —CR$^1$=CR$^1$—O—CO—$(CH_2)_n{'}$—, —N=CR$^1$—, —$(CH_2)_n{'}$—CO—O—CR$^1$=CR$^1$—, —CR$^1$=CR$^1$—O—CO—, —CO—O—CR$^1$=CR$^1$—, —CO—O—N=CR$^1$—, —CR$^1$=N—O—CO—, —CR$^1$=CR$^1$—CO—O—, —CO—S—, —O—CO—CR$^1$=CR$^1$—, —CR$^1$3 CR$^1$—CO—O—$(CH_2)_n{'}$—, —S—CO—, —$(CH^2)_n{'}$—O—CO—CR$^1$=CR$^1$—, —CHR$^1$—CHR$^1$—CO—O—, —O—CO—CHR$^1$—CHR$^1$—CHR$^1$—, —C≡C—C≡C—, —CR$^1$=CR$^1$—CR$^1$=CR$^1$—, —CO—NR$^1$—NR$^1$—CO—,

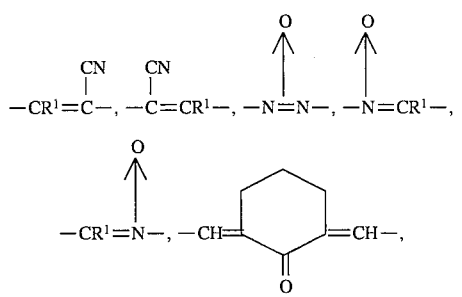

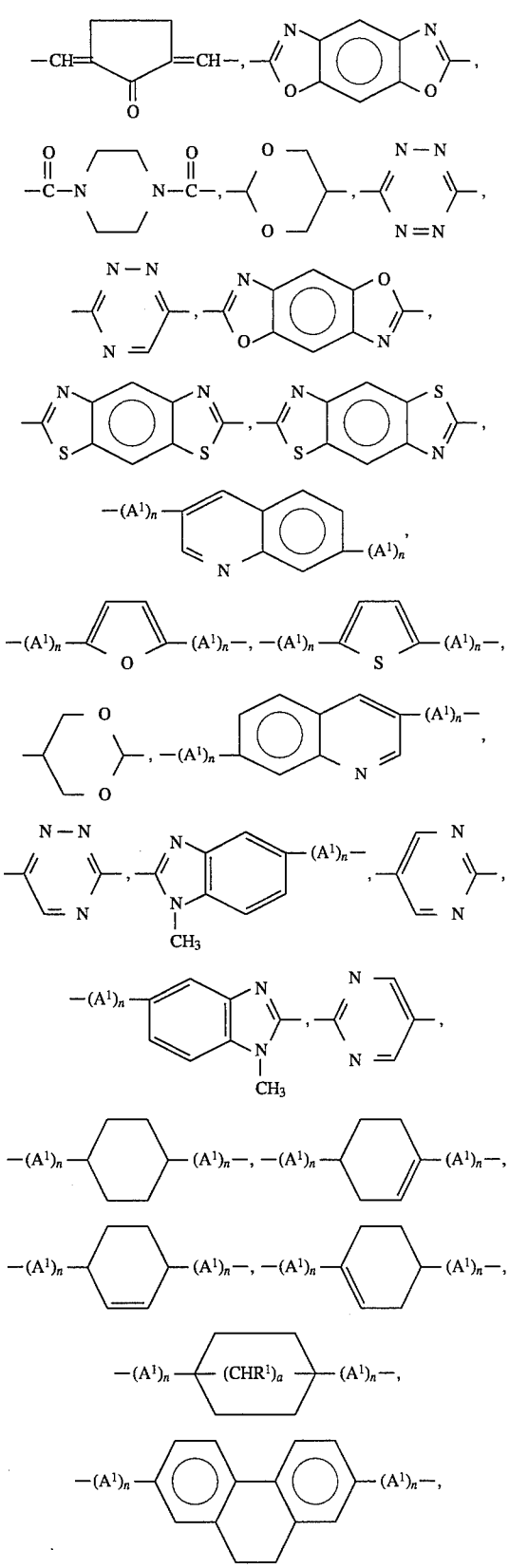

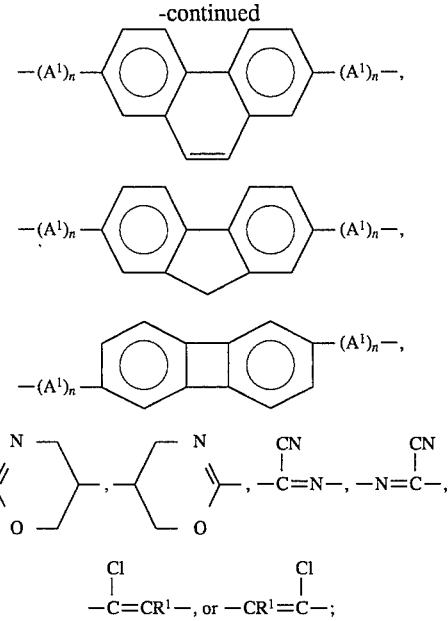

each A' is independently a divalent hydrocarbyl group having from 1 to about 10, preferably from 1 to about 4, carbon atoms; each A" is independently an alkylene group having from 1 to about 10 carbon atoms, preferably from 1 to about 4 carbon atoms, a direct bond, —O—, —CO—, —S—, —S—S—, —SO—, —SO$_2$— or —O—CO—O—; each A$^1$ is independently a —CO—, —O—CO—, —CO—O—, —CO—NR$^1$—, or —NR$^1$—CO— group; each R is independently hydrogen or a hydrocarbyl or hydrocarbyloxy group having from 1 to about 10, preferably from 1 to about 4, carbon atoms, a halogen atom, preferably chlorine or bromine, a nitro group, a nitrile group, a phenyl group or a —CO—R$^1$ group; each R$^1$ is independently hydrogen or a hydrocarbyl group having 1 to about 3 carbon atoms; n has a value of zero or one; n' has a value from 1 to about 6, preferably 1 to about 3; n" has a value from zero to about 6, preferably zero to about 3; a has a value of one or two; p has a value from 1 to about 30, preferably 1 to about 3; and wherein Im denotes the position to which the cyclic imino ether ring is attached. The aromatic rings can also contain one or more heteroatoms selected from N, O, S and the like.

The term cyclic imino ether as employed herein means any cyclic moiety containing the —N=C—O— group and thus encompasses both the 2-oxazolines and the 5,6-dihydro-4H-1,3-oxazines, as well as substituted derivatives thereof.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A' group of Formula III, the hydrocarbyl group can also contain one or more heteroatoms selected from N, O, S and the like. Likewise, the term hydrocarbyloxy means a hydrocarbyl group having an oxygen linkage between it and the carbon atom to which it is attached.

Another aspect of the present invention pertains to compositions resulting from polymerizing (thermosetting) one or more of the cyclic imino ether compositions containing one or more mesogenic moieties, optionally in the presence of one or more catalysts.

Another aspect of the present invention is directed to polymerizable compositions comprising a mixture containing (A) at least one cyclic imino ether composition containing one or more mesogenic moieties; and
(B) at least one of
  (1) at least one cyclic imino ether composition which does not contain mesogenic moieties;
  (2) at least one epoxy resin;
  (3) at least one polymaleimide;
  (4) at least one polyamine;
  (5) at least one polyphenol or polythiophenol;
  (6) at least one polycarboxylic acid or polythiocarboxylic acid;
  (7) at least one compound which contains in the same molecule both a phenolic hydroxyl or thiophenolic sulfhydryl group and an amino group;
  (8) at least one compound which contains in the same molecule both a phenolic hydroxyl or thiophenolic sulfhydryl group and a carboxylic acid or thiocarboxylic acid group;
  (9) at least one compound which contains in the same molecule both an amino group and a carboxylic acid or thiocarboxylic acid group;
  (10) at least one material which contains one or more mesogenic moieties and on the average only one cyclic imino ether group per molecule;
  (11) at least one prepolymer of any of the aforesaid components (1) through (10) or any combination of any two or more of said components; or
  (12) a mixture of any two or more of components (1) through (11) in any proportion and any combination.

Another aspect of the present invention pertains to compositions resulting from polymerizing the aforementioned polymerizable compositions.

A further aspect of the present invention pertains to products resulting from orienting any of the aforementioned polymerizable compositions.

The term prepolymers as employed herein means that the compound has been homooligomerized or cooligomerized or interoligomerized or homopolymerized or copolymerized or interpolymerized so as to cause an increase in molecular weight. This increase in molecular weight is such that complete curing (thermosetting) has not occurred or that complete chain extension has not occurred.

These compounds can also contain substituent groups such as saturated aliphatic hydrocarbon, unsaturated aliphatic hydrocarbon, halogens including chlorine bromine, fluorine, iodine, nitro, nitrile, and the like. Likewise, the hydrocarbon substituent groups can also be substituted with such halogens including chlorine bromine, fluorine, iodine, nitro, nitrile, and the like. Also, these compounds can be specifically free of any one or more of such substituent groups and likewise the substituted hydrocarbons can be specifically free of any one or more of such substituent groups. Further, such compounds and substituted hydrocarbons can contain any substituent group not specifically enumerated herein. Likewise, the compounds and substituted hydrocarbons can be free of any substituent group not specifically enumerated herein.

The present invention may suitably comprise, consist of, or consist essentially of, the aforementioned components.

The invention illustratively disclosed herein suitably may be practiced in the absence of any component which is not specifically disclosed or enumerated herein and any of the compounds may contain or be free of any substituent not specifically named herein.

DETAILED DESCRIPTION OF THE INVENTION

Preparation of the Cyclic Imino Ethers Containing One or More Mesogenic Moieties The cyclic imino ethers of the present invention may be prepared via two basic routes: Cyclic imino ethers containing one or more mesogenic moieties may be prepared by the in situ formation of the cyclic imino ether functionality in a mesogen-containing precursor compound. Additionally, cyclic imino ethers containing one or more mesogenic moieties may be prepared by coupling of a preformed cyclic imino ether compound and another compound. In this latter method, the preformed cyclic imino ether compound, the other compound being coupled with the cyclic imino ether compound or both of the aforesaid compounds may contain one or more mesogenic moieties. Alternately, or in addition, the coupling reaction of the preformed cyclic imino ether compound with the other compound being coupled with the cyclic imino ether compound may result in the formation of one or more mesogenic moieties.

Representative of the methods which may be employed to form the cyclic imino ether functionality include those described by John A. Frump, Oxazolines. Their Preparation, Reactions, and Applications, Chemical Reviews, volume 71, number 5, pages 483–505 (1971); Henry Wenker, Journal of the American Chemical Society, volume 60, pages 2152–2153 (1938); G. E. McCasland and E. Clyde Horswill, Journal of the American Chemical Society, volume 73, pages 3744–3746 (1951); Dan Haidukewych and A. I. Meyers, Tetrahedron Letters, number 30, pages 3031–3034 (1972) and U.S. Pat. No. 1,958,529 which are incorporated herein by reference. Briefly, these methods include the following:

A.) Reaction of an amino alcohol possessing —NH$_2$ and —OH groups on adjoining carbon atoms with a carboxylic acid with dehydration of the resultant β-hydroxyalkylamide provides the oxazoline.

B.) Methyl esters of carboxylic acids may be reacted with amino alcohols to provide oxazolines.

C.) Treatment of an amino alcohol hydrochloride with an imidic acid ester hydrochloride provides the oxazoline. Iminoesters and β-hydroxyamines or their respective hydrochlorides react to provide oxazolines.

D.) Certain oxazolines are obtained via reaction of an aminoalcohol with an amidine salt.

E.) Reaction of an amino alcohol with an organic trihalide in the presence of sodium carbonate provides 2-substituted-2-oxazolines.

F.) Certain amides and alkanolamides are cyclized to oxazolines in the presence of a dehydrating agent and/or heat.

G.) N-(2-haloalkyl)amides are cyclized to oxazolines by treatment with base.

H.) Various reactions with aziridines provide oxazolines. Exemplary is the tin tetrachloride catalyzed rearrangement of N-acylethylenimines to 2-substituted-2-oxazolines.

I.) Aliphatic epoxides are reacted with nitriles in a concentrated sulfuric acid medium followed by neutralization to give oxazolines.

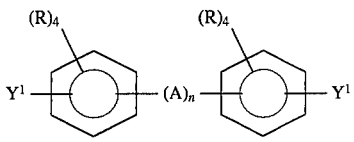

FORMULA V

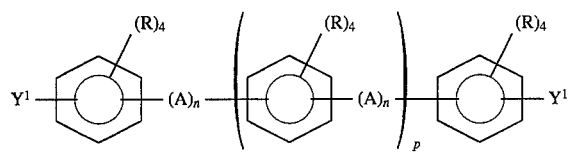

FORMULA VI

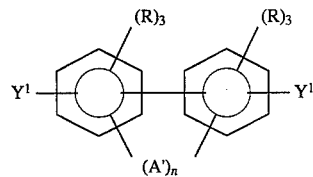

FORMULA VII

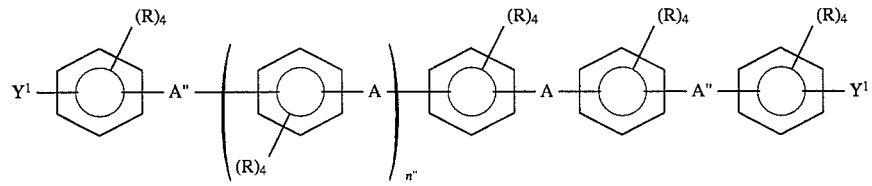

FORMULA VIII

As a specific method for forming certain cyclic imino ethers containing one or more mesogenic moieties of the present invention via in situ formation of the cyclic imino ether functionality in a mesogen-containing precursor compound, the bis(N-(2-haloalkyl)amide) of a mesogen-containing dicarboxylic acid is subjected to conditions leading to cyclic imino ether formation. Conditions for the cyclic imino ether formation can vary substantially, for example, as a function of the structure and stability of the bis(N-(2-haloalkyl)amide used, the structure and stability of the bis(cyclic imino ether) product obtained, reactant and/or product solubility if a solvent is used, reaction time, reaction temperature, and the like, but generally comprise reacting the bis(N-(2-haloalkyl)amide) of a mesogen-containing dicarboxylic acid with a stoichiometric quantity or a stoichiometric excess (up to about 50 percent excess) of a base compound per halo group, optionally in the presence of a suitable solvent, optionally with heating or cooling, and optionally with reduced pressure.

Reaction temperatures, times and pressures can vary substantially, for example, as a function of the reactants being employed, the solvent(s) used, if any, the scale of the reaction, and the like. Reaction temperatures of from about −10° C. to about 200° C. are operable, with reaction temperatures of 10° C. to 75° C. being preferred. Reaction times of from about one minute to about 24 hours are operable, with reaction times of 5 minutes to two hours being preferred. Ambient reaction pressure is preferred, although reduced pressures as low as 1 mm Hg may be employed.

Suitable mesogen-containing N-(2-haloalkyl)amides which can be employed to prepare the cyclic imino ethers containing one or more mesogenic moieties include, for example, those represented by the Formulas V, VI, VII or VIII wherein at least about 80 percent of the —A— linkages in Formulas V, VI and VIII and the direct bond between the two aromatic rings in Formula VII and the $Y^1$ groups are in the para position with respect to each other; each $Y^1$ is a N-(2-haloalkyl)amide group; each A, A', A", $A^1$, R, $R^1$, n, n', n", a and p are as hereinbefore defined. The aromatic rings can also contain one or more heteroatoms selected from N, O, S and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A' group of Formula VII, the hydrocarbyl group can also contain one or more heteroatoms selected from N, O, S and the like. Likewise, the term hydrocarbyloxy means a hydrocarbyl group having an oxygen linkage between it and the carbon atom to which it is attached.

Particularly suitable bis(N-(2-haloalkyl)amide)s are the bis(N-(2-haloalkyl)amide)s of 4,4'-dicarboxy-alpha-methylstilbene, 4,4'-dicarboxychalcone, 4,4-dicarboxydiphenylacetylene, 4,4'-dicarboxydiphenylazomethine, 4,4'-dicarboxyazobenzene, 4,4'-dicarboxyazoxybenzene, 4,4'-bis(4-carboxyphenoxy)diphenyl, 4,4'-dicarboxy-alpha-cyanostilbene, 4,4'-dicarboxybenzanilide, 4-carboxyphenyl-4-carboxybenzoate,

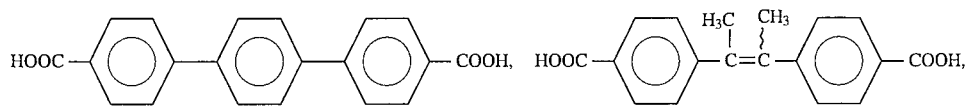
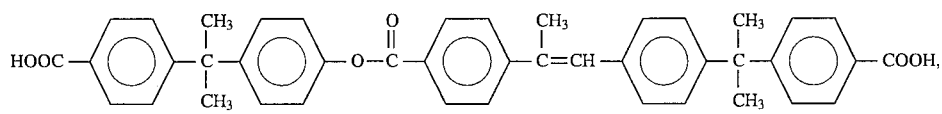
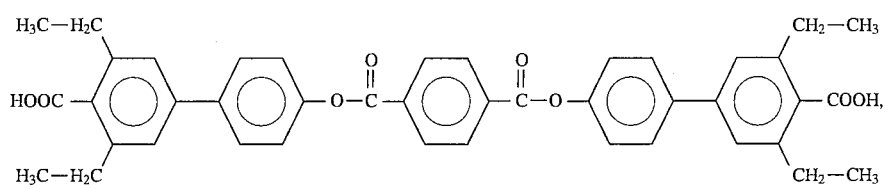
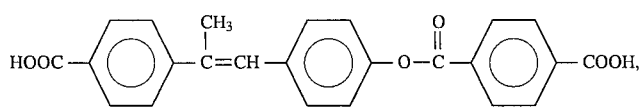
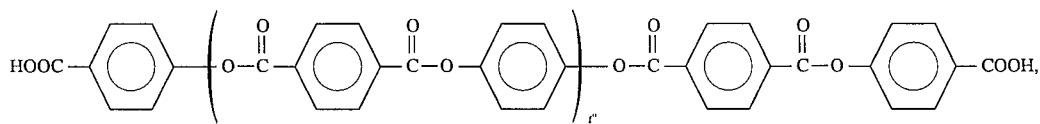
wherein t" has a value from 1 to about 10,
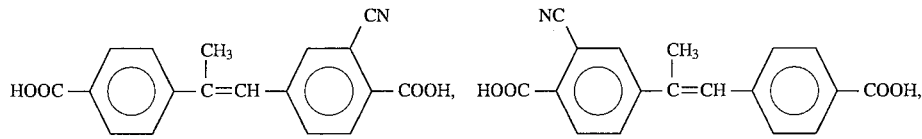
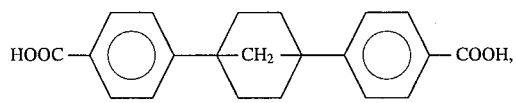
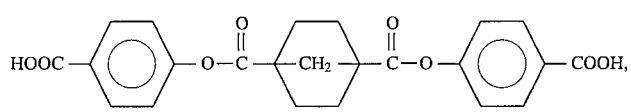
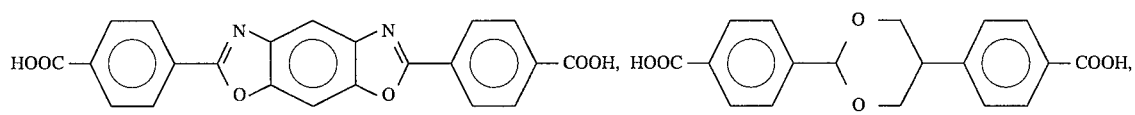
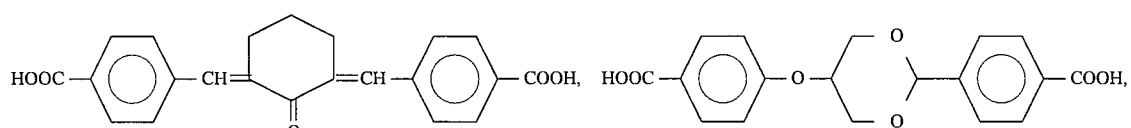
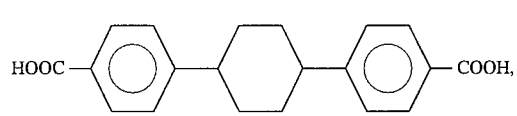
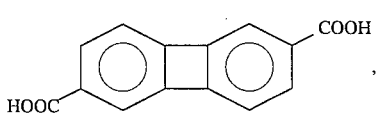

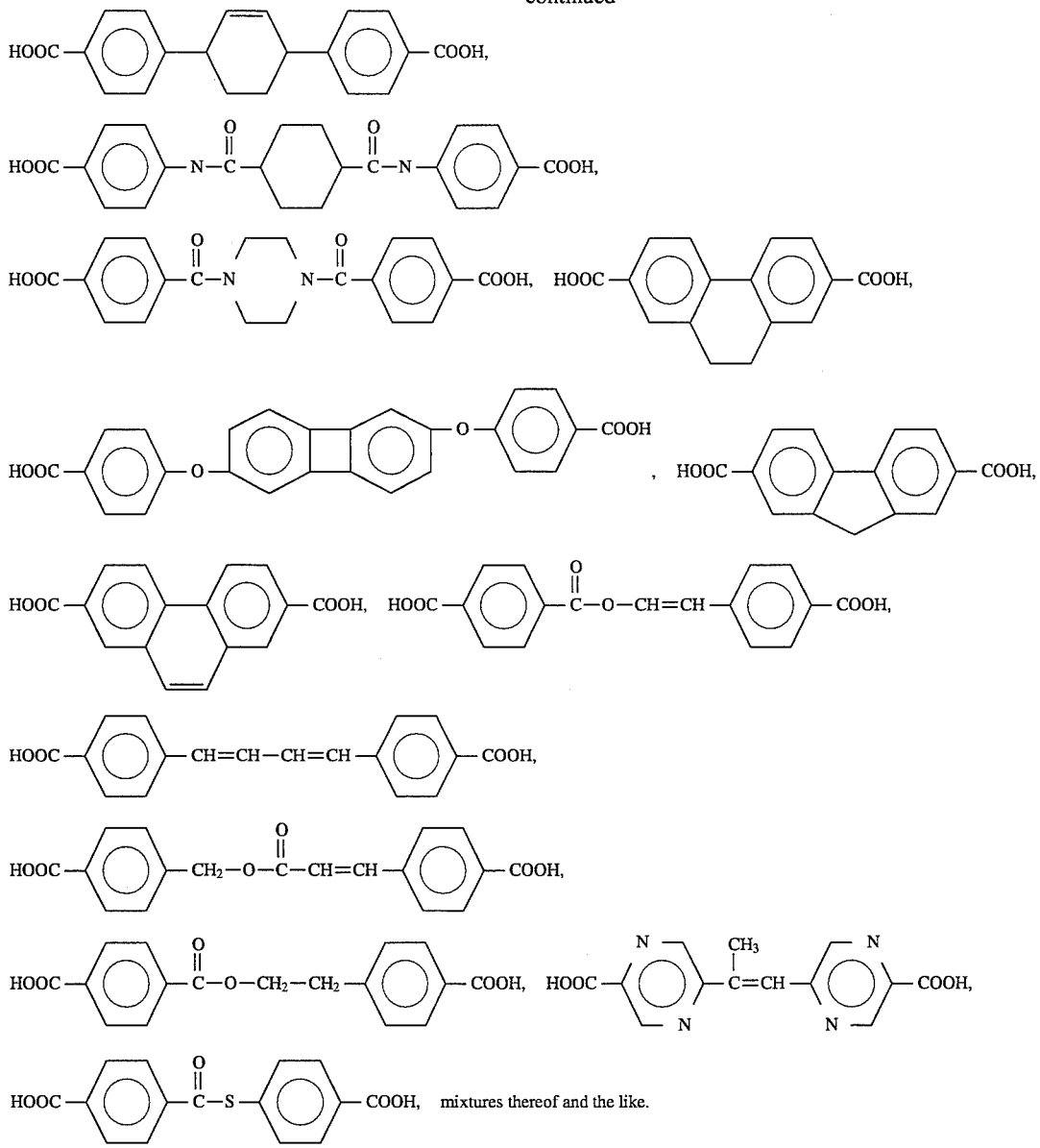

-continued mixtures thereof and the like.

The base compound used in the cyclic imino ether forming reaction can vary substantially, for example, as a function of the structure and stability of the bis(N-(2-haloalkyl)amide used, the structure and stability of the bis(cyclic imino ether) product obtained, the solvent used, if any, reaction time, reaction temperature, and the like.

Suitable base compounds include both inorganic bases and organic bases such as sodium hydroxide, potassium hydroxide, sodium carbonate, potassium carbonate, sodium ethoxide, sodium methoxide trimethylamine, triethylamine, diethylamine, aniline, mixtures thereof, and the like.

Suitable solvents which may optionally be used for the cyclic imino ether forming reaction include water, aliphatic ketones, chlorinated hydrocarbons, aliphatic and cycloaliphatic ethers and diethers, aliphatic and aromatic hydrocarbons, mixtures thereof and the like.

A wide variety of cyclic imino ethers useful in the coupling reaction with another compound to form a cyclic imino ether containing one or more mesogenic moieties are available. Specific examples include:

A.) Cyclic imino ethers containing a phenolic hydroxyl group useful for subsequent coupling reaction with other compounds may be prepared. For example, 2-(4-hydroxyphenyl)oxazoline is prepared via cyclization of N-(2-chloroethyl)-4-hydroxybenzamide with aqueous sodium hydroxide, as is described in U.S. Pat. No. 4,490,771, which is incorporated herein by reference.

B.) Cyclic imino ethers containing an aliphatic hydroxyl group useful for subsequent coupling reaction with other compounds may be prepared via reaction of an α-hydroxy acid and an amino alcohol. For example, N-(β-hydroxyethyl)glycolamide passed through a column filled with kaolin and heated to 280° C. provided 2 -(hydroxymethyl)-2-oxazoline, as is described by French Patent No. 1,546,405, which is incorporated herein by reference. As an additional example, reaction of cyanamide and propylene oxide in aqueous media provides a mixture of 2[(2-hydroxypropyl)amino]-5-methyl-2-oxazoline and 2-[bis(2-hydroxypropyl)amino]-5-methyl-2-oxazoline, as is described by A. E. Kretov and I. S. Matveev in Chemical Abstracts, volume 55, number 27,269 (1961), which is incorporated herein by reference. Additionally, aliphatic hydroxyl groups may be incorporated into various oxazoline derivatives via alkoxylation reaction with an alkylene oxide. A specific example would be the ethoxylated product resulting from reaction of ethylene oxide and 2-phenylamino-2-oxazoline.

C.) Cyclic imino ethers containing a mercaptan group useful for subsequent coupling reaction with other compounds may be prepared by the reaction of carbon disulfide with certain amino alcohols. As a specific example, carbon disulfide and 2-amino-2-methyl-1-propanol react to give 2-mercapto-4,4-dimethyl-2-oxazoline, as is described by A. A. Rosen, Journal of the American Chemical Society, volume 74, pages 2994–2997 (1952), which is incorporated herein by reference.

D.) Cyclic imino ethers containing a primary amine group useful for subsequent coupling reaction with other compounds may be prepared by the heating of certain substituted guanidine compounds. As a specific example, 1-(2-hydroxyethyl)guanidine is heated to form 2-amino-2-oxazoline, as is described by L. Fishbein and J. A. Gallaghan, Journal of Organic Chemistry, volume 21, 434– 435 (1956), which is incorporated herein by reference. As a second specific example, 2-phenyl-2-oxazoline is nitrated to provide 2-m-nitrophenyloxazoline which is then reduced to give 2-m-aminophenyloxazoline, as is described by M. T. Leffler and R. Adams, Journal of the American Chemical Society, volume 59, 2252–2258 (1937), which is incorporated herein by reference.

E.) Cyclic imino ethers containing a secondary amine group useful for subsequent coupling reaction with other compounds may be prepared by reaction of isocyanates with aziridinium tetrafluoroborate. As a specific example, phenyl isocyanate and aziridinium tetrafluoroborate react to provide 2-phenylamino-2-oxazoline, as is described by E. Pfeil and K. Milzner, Angewandte Chemie, International Edition in English, volume 5, pg. 667 (1966), which is incorporated herein by reference.

As a specific method for forming certain cyclic imino ethers containing one or more mesogenic moieties of the present invention via coupling of a preformed cyclic imino ether compound and another compound, a mesogen-containing dicarboxylic acid halide and a cyclic imino ether compound containing a phenolic hydroxyl group are reacted in the presence of a base compound as the acid acceptor, such as triethylamine, optionally in the presence of a suitable solvent and optionally with heating or cooling. The resultant product is the bis(oxazoline) linked to the mesogen via ester linkages formed by reaction of the acid halide groups and phenolic hydroxyl groups. Similarly, reaction of a mesogen-containing dicarboxylic acid halide and a cyclic imino ether compound containing an aliphatic hydroxyl group, a mercaptan group, a primary amine group or a secondary amine group produces a bis(oxazoline) linked to the mesogen via ester, thioester, secondary amide or tertiary amide linkages, respectively.

Reaction times and temperatures can vary substantially for the coupling reactions, for example, as a function of the reactants being employed, the solvent(s) used, if any, the scale of the reaction, and the like. Reaction temperatures of from about –40° C. to about 150° C. are operable, with reaction temperatures of –10° C. to 75° C. being preferred. Reaction times of from about five minutes to about 48 hours are operable, with reaction times of 15 minutes to eight hours being preferred.

The base compounds previously cataloged and the solvents previously cataloged for optional use in the cyclic imino ether forming reaction are generally operable in the coupling reactions, but can vary substantially, for example, as a function of the structure and stability of the reactants used, the structure and stability of the bis(oxazoline) product obtained, the solvent used, if any, reaction time, reaction temperature, and the like.

Suitable mesogen containing dicarboxylic acid halides include those represented by the aforementioned Formulas V, VI, VII or VIII wherein at least about 80 percent of the —A— linkages in Formulas V, VI and VIII and the direct bond between the two aromatic rings in Formula VII and the $Y^1$ groups are in the para position with respect to each other; each $Y^1$ is a —CO—Cl or —CO—Br group; each A, A', A", $A^1$, R, $R^1$, n, n', n", a and p are as hereinbefore defined. The aromatic rings can also contain one or more heteroatoms selected from N, O, S and the like.

Polymerization of the Cyclic Imino Ether Compositions Containing One or More Mesogenic Moieties The cyclic imino ether compositions containing one or more mesogenic moieties are polymerized by heating from about 30° C. to about 450° C., preferably by heating from 50° C. to 400° C., optionally in the presence of a suitable catalyst.

Suitable catalysts include, for example, Lewis acids, strong protonic acids, salts of protonic acids, esters of protonic acids, acid anhydrides, alkyl halides and stable cationic salts. Representative of these catalysts are aluminum chloride, boron trifluoride, boron trifluoride etherate, boron trifluoride complexes with oxazoline monomers, fluoroboric acid, perchloric acid salts of oxazoline monomers, p-nitrobenzenediazonium fluoroborate, tin tetrachloride, zinc chloride, sulfuric acid, p-toluenesulfonic acid, methyl-p-toluenesulfonate, trifluoromethanesulfonic acid, dimethyl sulfate, methyl iodide, ethyl iodide, methyl bromide, iodine, ammonium hydrosulfide, and the like. The quantity of catalyst used, if any, depends on the structure of the particular catalyst, the structure of the cyclic imino ether(s) being polymerized (copolymerized), the temperature, the reaction time, and the like. Generally catalyst concentrations of from about 0.001 to about 2 percent by weight are preferred.

Ring-opening polymerization of the cyclic imino ether compositions of the present invention initiated by the aforementioned cation-active catalysts provides poly(N-acylalkylenimine)s containing mesogenic moieties. Thus, the product of the polymerization when the cyclic imino ether composition is a 2-substituted-2-oxazoline is the corresponding poly(N-acyl-substituted ethyleneimine) containing mesogenic moieties. When the cyclic imino ether composition is an oxazoline, two or more of the ring positions must be hydrogen for ring-opening polymerization initiated by the aforementioned cation-active catalysts to occur.

Cyclic Imino Ether Compositions Which Do Not Contain Mesogenic Moieties and Which Can Be Employed in the Polymerizable and Polymerized Compositions Suitable cyclic imino ethers which do not contain mesogenic moieties and which can be employed to prepare the polymerizable mixtures of the present invention include, for example, those represented by the following Formulas IX, X, XI and XII

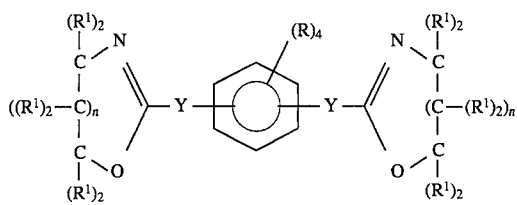

FORMULA IX

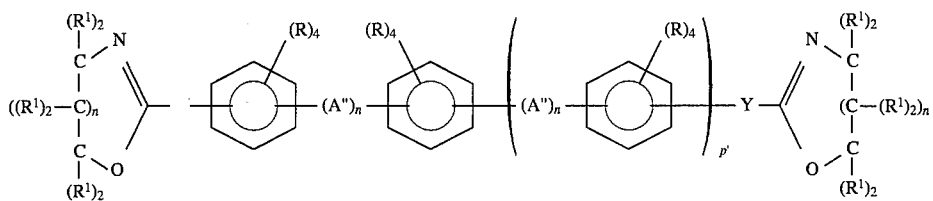

FORMULA X

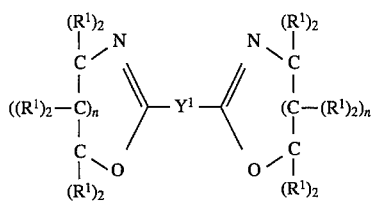

FORMULA XI

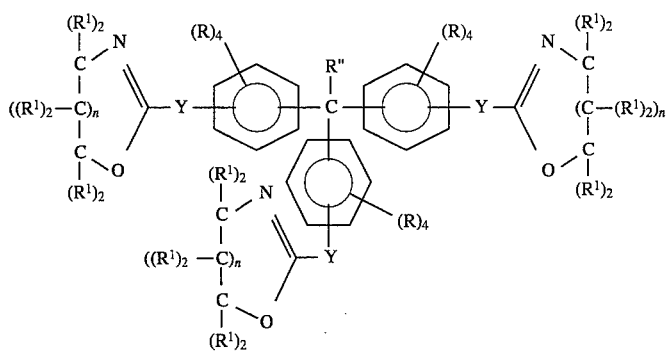

FORMULA XII wherein R, $R^1$, $R^2$, Q, $Q^1$, Y, A", n, n', n", p and Im are as hereinbefore defined; $Y^1$ is a direct single bond or a divalent aliphatic, cycloaliphatic, polycycloaliphatic, alkenyl, cycloalkenyl or polycycloalkenyl group and can also contain one or more heteroatoms selected from N, O, S and the like; each R" is independently hydrogen, a hydrocarbyl or hydrocarbyloxy group having from 1 to about 10, preferably 1 to about 4 carbon atoms, a halogen, preferably chlorine or bromine, or a phenyl group and p' has a value from zero to about 100, preferably from zero to about 30. The aromatic rings can also contain one or more heteroatoms selected from N, O, S and the like.

Suitable cyclic imino ether compositions which do not contain mesogenic moieties represented by Formulas IX, X and XI include, for example, 2,2'-bisoxazoline, 2,2'-tetramethylenebis(2-oxazoline),
2,2'-heptamethylenebis(2-oxazoline),
2,2'-heptamethylenebis(5-methyl(-2-oxazoline),
2,2'-(1,3-cyclohexylene)bis(2-oxazoline),
2,2'-(3,5-norbornylene)bis(2-oxazoline),
2,2'-(1,3-phenylene)bis(2-oxazoline),
2,2'-(1,4-phenylene)bis (2-oxazoline),
2,2'-(1,4-phenylene)bis(5,6-dihydro-4H-1,3-oxazine),
sulfonylbis2-(1,4-phenylene) (4,5-dihydrooxazole),
thiobis2-(1,4-phenylene) (4,5-dihydrooxazole),
oxybis2-(1,4-phenylene) (4,5-dihydrooxazole),
2,2'-(1,4-butanediyl )bis(2-oxazoline),
methylenebis2-(1,4-phenylene) (4,5-dihydrooxazole),

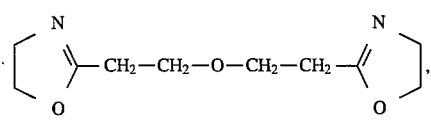

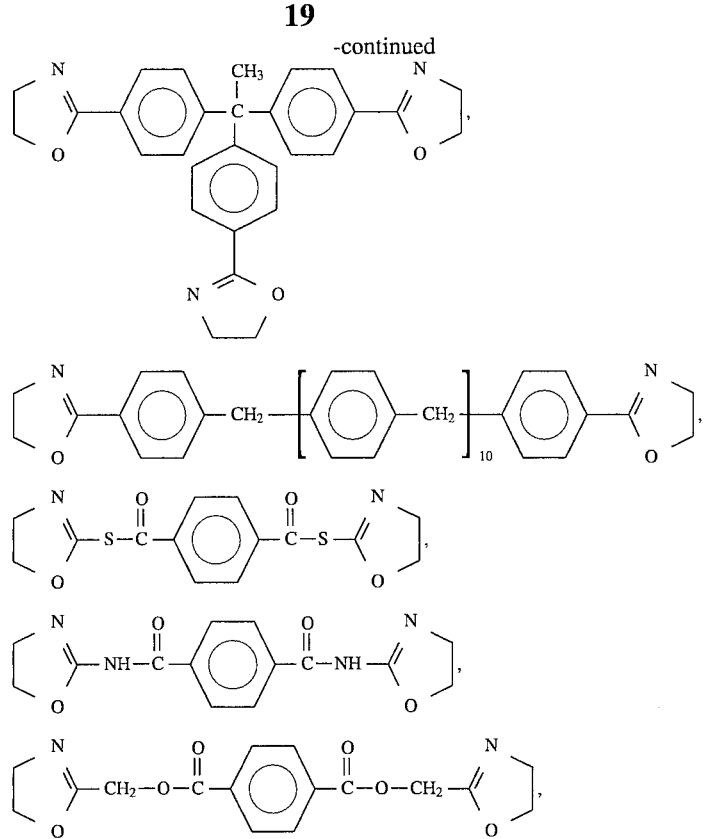

and the like.

The cyclic imino ether compositions which do not contain mesogenic moieties are prepared using the corresponding precursor reactants free of mesogenic moieties and the previously described chemistry for formation of the cyclic imino ethers. As a specific process unique to the present invention, mixtures of precursor reactants which do not contain mesogenic moieties with precursor reactants which contain one or more mesogenic moieties may be subjected to a cyclic imino ether forming reaction to provide a polymerizable mixture of the present invention.

Epoxy Resins Which Can Be Employed in the Polymerizable and Polymerized Compositions Suitable epoxy resins which can be employed to prepare the polymerizable mixtures of the present invention include materials having an average of more than one vicinal epoxide group per molecule, such as, for example, the epoxy resins represented by the following Formulas XIII, XIV, XV, XVI, XVII, XVIII, XIX, XX, XXI, XXII

FORMULA XIII

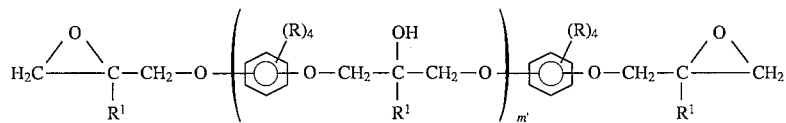

FORMULA XIV

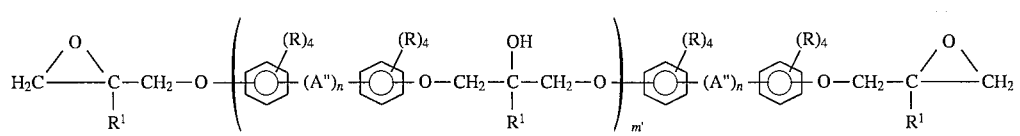

-continued
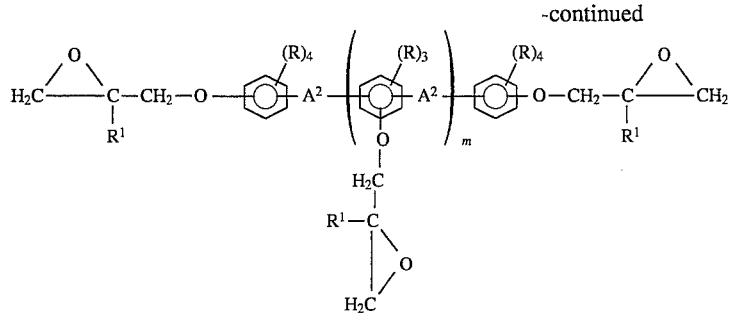
FORMULA XV
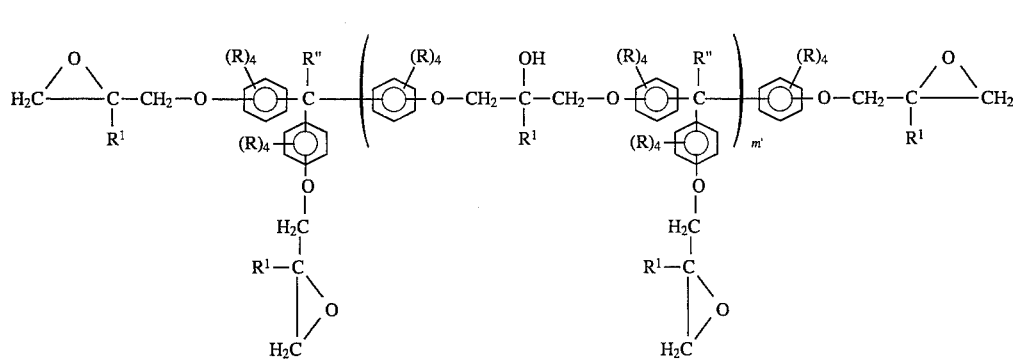
FORMULA XVI
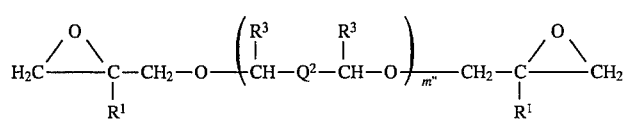
FORMULA XVII
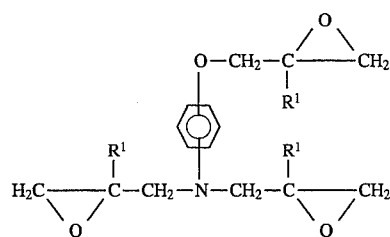
FORMULA XVIII
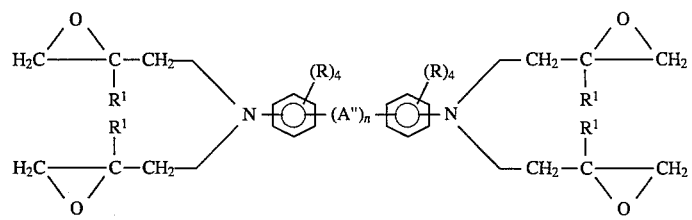
FORMULA XIX
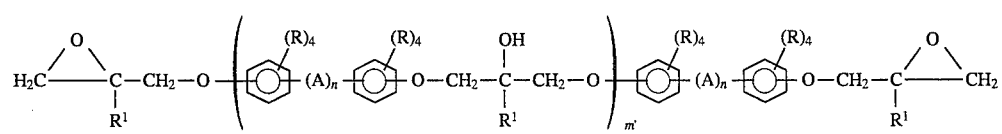
FORMULA XX
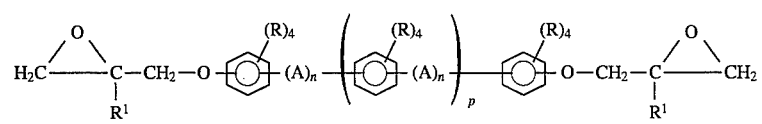
FORMULA XXI
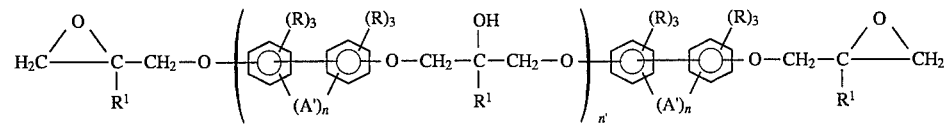
FORMULA XXII
wherein A, A', A", $A^1$, R, $R^1$, $R^2$, R", a, n, n' and p are as hereinbefore defined; each $A^2$ is independently an alkylene group having from 1 to about 10, preferably from 1 to about 4 carbon atoms or

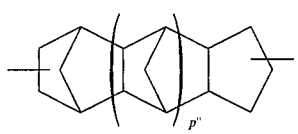

group; p" has a value of from zero to about 10, preferably from zero to 3; each $R^3$ is independently hydrogen, or a hydrocarbyl or halohydrocarbyl group having from 1 to about 6, preferably 1 to about 2 carbon atoms; $Q^2$ is a direct bond, —CH$_2$—S—CH$_2$—, —(CH$_2$)$_n^1$—, or

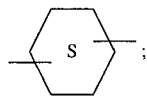

m has a value of from about 0.001 to about 6, preferably from about 0.01 to about 3; m' has a value of from zero to about 30, preferably from about zero to about 5; m" has a value from 1 to about 10, preferably from about 1 to about 4 and $n^1$ has an average value from about 1 to about 10. The aromatic rings can also contain one or more heteroatoms selected from N, O, S and the like.

Particularly suitable epoxy resins represented by formulas XIII, XIV, XV, XVI, XVII, XVIII, XIX, XX, XXI and XXII are the diglycidyl ethers of resorcinol, hydroquinone, dihydroxydiphenyl methane, bisphenol A, 3,3',5,5'-tetrabromobisphenol A, 4,4'-sulfonyldiphenol, 4,4'-thiodiphenol, 4,4'-dihydroxydiphenyl oxide, 4,4'-dihydroxybenzophenone, 2,2'-dihydroxydiphenyl, dicyclopentadiene diphenol, tricyclopentadiene diphenol, 4,4'-dihydroxydiphenyl, 4,4'-dihydroxystilbene, 4,4'-dihydroxy-alpha-methylstilbene, 4,4'-dihydroxy-alpha-cyanostilbene, 4,4'-dihydroxychalcone, 4,4'-dihydroxydiphenylacetylene, 4,4'-dihydroxydiphenylazomethine, 4,4'-dihydroxyazobenzene, 4,4'-bis(4-hydroxyphenoxy)diphenyl, 4,4'-dihydroxybenzanilide, ethylene glycol, thiodiglycol, diethylene glycol, dipropylene glycol, polypropylene glycol, polyethylene glycol, 1,4-cyclohexanediol, dibutylene glycol, the advancement reaction product of the diglycidyl ether of bisphenol A and bisphenol A, the advancement reaction product of the diglycidyl ether of 4,4'-dihydroxy-alpha-methylstilbene and 4,4'-dihydroxy-alpha-methylstilbene, the triepoxide of p-aminophenol, the tetraepoxide of 4,4'-diamino-diphenyl methane, the triglycidyl ether of tris(hydroxyphenyl)methane, the tetraglycidyl ether of 2,2',4,4'-tetrahydroxydiphenyl methane, the polyglycidyl ether of a phenolformaldehyde condensation product (novolac), the polyglycidyl ether of a dicyclopentadiene or oligomer thereof and phenol or halogen or alkyl substituted phenol condensation product and the like.

The aforementioned epoxy resins can be prepared by reaction of a polyphenol (polyamine, aminophenol, polyalkylene glycol) with an epihalohydrin and a basic acting material. Said reaction generally involves two distinct steps: coupling reaction of the epihalohydrin and polyphenol to provide a halohydrin intermediate and dehydrohalogenation reaction of the halohydrin intermediate to provide the glycidyl ether product. Suitable catalysts and reaction conditions for preparing epoxy resins are described in the *Handbook of Epoxy Resins* by Lee and Neville, McGraw-Hill (1967) which is incorporated herein by reference.

Polymaleimides for Use in the Polymerizable and Polymerized Compositions

Suitable polymaleimides which can be employed to prepare the polymerizable mixtures of the present invention include, for example, those represented by the Formulas XXIII, XXIV, XXV, XXVI, XXVII, XXVIII, XXIX, XXX:

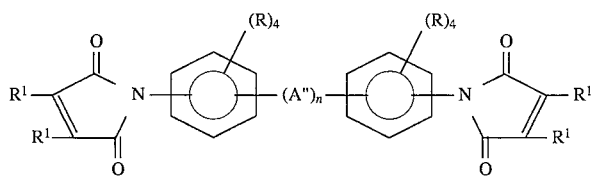

FORMULA XXIII

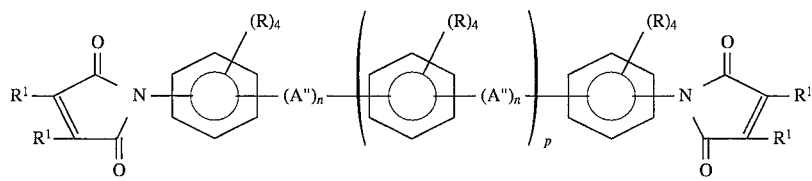

FORMULA XXIV

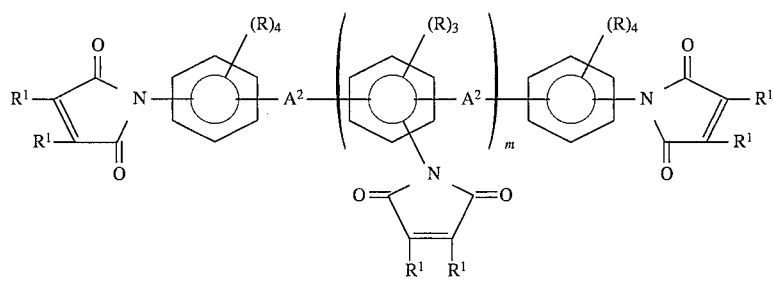

FORMULA XXV

-continued

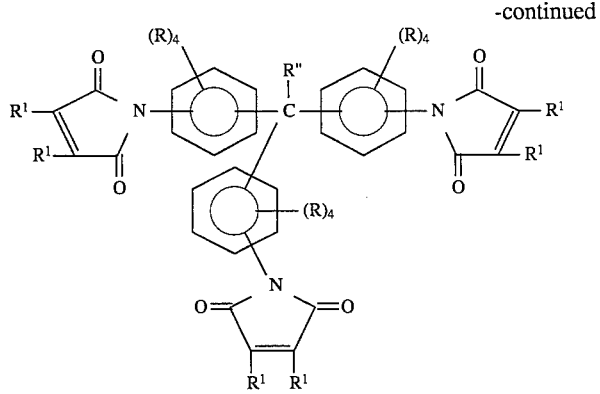

FORMULA XXVI

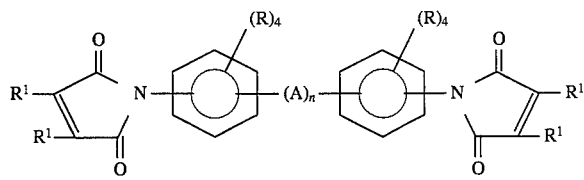

FORMULA XXVII

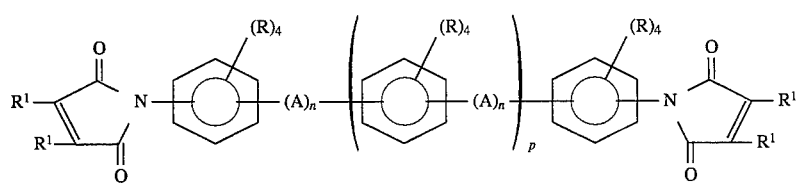

FORMULA XXVIII

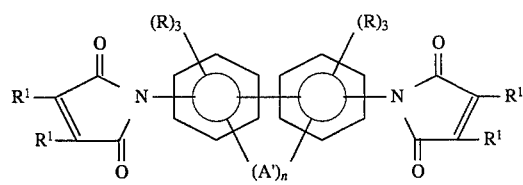

FORMULA XXVIX

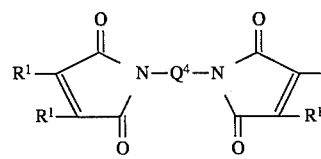

FORMULA XXX wherein A, $A^2$, A', A", $A^1$, R, $R^1$, R", m, a, n, n' and p are as hereinbefore defined and $Q^4$ is a divalent hydrocarbyl group having from 2 to about 12 carbon atoms and may be linear or branched aliphatic, cycloaliphatic or polycycloaliphatic. The aromatic rings can also contain one or more heteroatoms selected from N, O, S and the like.

Particularly suitable polymaleimides represented by formulas XXIII, XXIV, XXV, XXVI, XXVII, XXVIII, XXIX and XXX are N,N'-ethylenebismaleimide, N,N'-ethylenebis(2-methylmaleimide), N,N'-hexamethylenebismaleimide, N,N'-(oxydi-p-phenylene)bismaleimide, N,N'-(methylenedi-p-phenylene)maleimide, N,N'-(methylenedi-p-phenylene)bis( 2-methylmaleimide), N,N'-(thio-di-p-phenylene)bismaleimide, N,N'-(sulfonyldi-m-phenylene)bismaleimide, N,N'-(isopropylidenedi-p-phenylene)bismaleimide, polymethylene polyphenylene polymaleimides, the bismaleimide of 4,4'-diaminostilbene, the bismaleimide of 4,4'-diaminobenzanilide and the like.

The polymaleimides can be prepared by reacting a stoichiometric quantity of a maleic anhydride per amine group with a polyamine in the presence of a suitable solvent, such as, for example, aromatic hydrocarbons, chlorinated hydrocarbons or N,N-dimethylformamide. The polymaleamic acid resulting from reaction of a maleic anhydride and a polyamine may be isolated and dehydrated to the desired polymaleimide. Alternately, the reaction may be performed in a single continous step. Detailed procedures for preparing polymaleimides can be found in U.S. Pat. Nos. 2,444,536; 2,462,835; and *Journal of Polymer Science: Part A: Polymer Chemistry*, Vol. 27, pages 375–388 (1989) which are incorporated herein by reference.

Polyamines Suitable For Use in the Polymerizable and Polymerized Compositions

Suitable polyamines which can be employed to prepare the polymerizable mixtures of the present invention include, for example, those represented by the following Formulas XXXI, XXXII, XXXIII, XXXIV, XXXV, XXXVI, XXXVII

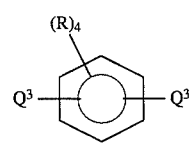

Formula XXXI

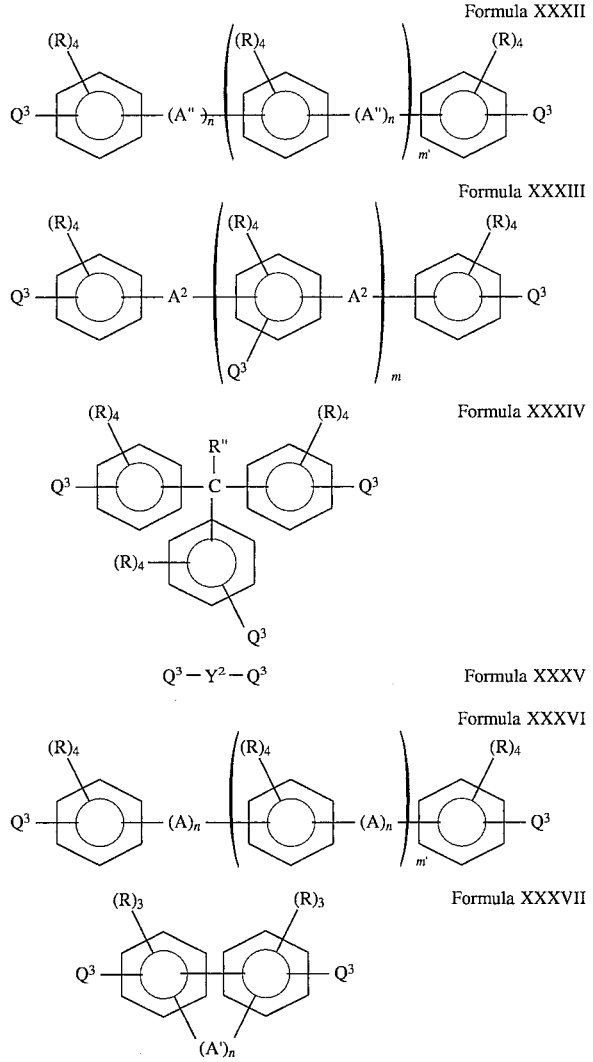

Formula XXXII

Formula XXXIII

Formula XXXIV

Formula XXXV

Formula XXXVI

Formula XXXVII wherein A, A', A", $A^1$, $A^2$, R, $R^1$, R", a, m and m' are as hereinbefore defined, each $Q^3$ is independently a —$NHR^4$ group, $R^4$ is hydrogen or a hydrocarbyl group having from 1 to about 10, preferably 1 to about 2 carbon atoms, $Y^2$ is a divalent aliphatic, cycloaliphatic, polycycloaliphatic, alkenyl, cycloalkenyl or polycycloalkenyl group and can also contain one or more heteroatoms selected from N, O, S and the like.

Typical representatives of said polyamines include 1,4-diaminobenzene, 2,4-diaminotoluene, 4,4'-diaminodiphenyl oxide, 4,4'-diaminodiphenyl methane, an aniline-formaldehyde condensation product, tris(aminophenyl)methane, 1,4-diaminonorbornane, 4,4'-diamino-alpha-methylstilbene, 4,4'-diaminobenzanilide, 4,4'-diaminoazoxybenzene and the like.

Polyphenols and Polythiophenols Suitable For Use in the Polymerizable and Polymerized Compositions Suitable polyphenols or polythiophenols which can be employed to prepare the polymerizable mixtures of the present invention include, for example, those represented by the aforementioned Formulas XXXI, XXXII, XXXIII, XXXIV, XXXVI, XXXVII wherein A, A', A", $A^1$, $A^2$, R, $R^1$, R", n, n', a, m and m' are as hereinbefore defined and each $Q^3$ is independently —OH or —SH.

Typical representatives of said polyphenols include resorcinol, 4,4'-sulfonyldiphenol, 4,4'-dihydroxydiphenyl oxide, tris(hydroxyphenyl)methane, phenolformaldehyde condensation products, 4,4'-isopropylidenediphenol, 4,4'-dihydroxystilbene, 4,4'-dihydroxy-alpha-methylstilbene, 4,4'-dihydroxybiphenyl, 4,4'-dihydroxybenzanilide, 4,4'-dihydroxyazoxybenzene, 4,4'-dihydroxydiphenylazomethine, 4,4'-dihydroxy-alpha-chlorostilbene, 4,4'-dihydroxy-alpha-cyanostilbene, 4,4'-dimercapto-alpha-methylstilbene and the like.

Polycarboxylic Acids and Polythiocarboxylic Acids Suitable For Use in the Polymerizable and Polymerized Compositions Suitable polycarboxylic acids and polythiocarboxylic acids which can be employed to prepare the polymerizable mixtures of the present invention include, for example those represented by the aforementioned Formulas XXXI, XXXII, XXXIV, XXXV, XXXVI, XXXVII wherein A, A', A", $A^1$, R, $R^1$, R", $Y^2$ n, n', a, and m' are as hereinbefore defined and each $Q^3$ is independently a —CO—OH or —CO—SH group.

Typical representative of said polycarboxylic acids and polythiocarboxylic acids include 1,4-dicarboxybenzene, 4,4'-dicarboxydiphenyl oxide, 4,4'-dicarboxydiphenyl methane, 4,4'-dicarboxydiphenyl sulfone, tris(carboxyphenyl)methane, 1,4-butanedicarboxylic acid, 1,4'-cyclohexanedicarboxylic acid, 1,4-norbornanedicarboxylic acid, 4,4'-dicarboxystilbene, 4,4'-dicarboxy-alpha-methlystilbene, 4,4'-dicarboxybiphenyl, 4,4'-dicarboxybenzanilide, 4,4'-dicarboxydiphenylazomethine, 4,4'-dicarboxychalcone, 4,4'-dicarboxy-alpha-chlorostilbene, 4,4'-dicarboxy-alpha-cyanostilbene, 4,4-dithiocarboxystilbene, 1,4-butanedithiocarboxylic acid and the like.

Compounds Containing Both a Phenolic Hydroxyl Group and an Amino Group For Use in the Polymerizable and Polymerized Compositions Suitable compounds which contain both a phenolic hydroxyl group and an amino group in the same molecule that can be used to prepare the polymerizable mixtures of the present invention include, for example, those representated by the aforementioned Formulas XXXI, XXXII, XXXVI, XXXVII, as well as a compound represented by the following Formula XXXVIII

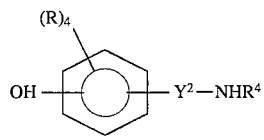

FORMULA XXXVIII wherein A, A', A", $A^1$, R, $R^1$, $R^4$, $Y^2$ n, n', a and m' are as hereinbefore defined and each $Q^3$ independently a —$NHR^4$ or —OH group.

Suitable compounds which contain a phenolic hydroxyl group and an amino group in the same molecule include, for example, o-, m-, p-aminophenol, 4-amino-4'-hydroxybiphenyl, 4-hydroxyphenyl-4'-aminobenzoate, 4 -hydroxy-4'-aminostilbene, 4-hydroxyphenyl-4'-aminophenylazomethine, 4-hydroxy-4'-amino-alpha-methylstilbene, 4-hydroxy-4'-amino-alpha-cyanostilbene, 4'-hydroxy-4'-amino-alpha-chlorostilbene, 4-aminomethylphenol, 4-N-methylaminomethylphenol, 4-beta-aminoethylphenol, 4-(1-(3-aminophenyl)-1-methylethyl)phenol, 4-(1-(4-aminophenyl)-1-methylethyl)phenol, 4-(4-aminophenoxy)phenol, 4-((4-aminophenyl)thio)phenol, (4-aminophenyl)(4-hydroxyphenyl)methanone, 4-((4-aminophenyl)sulfonyl)phenol and the like.

Compounds Containing Both a Phenolic Hydroxyl Group and a Carboxylic Acid or Thiocarboxylic Acid Group For Use in the Polymerizable and Polymerized Compositions Suitable compounds which contain both a phenolic hydroxyl group and a carboxylic acid or thiocarboxylic acid group in the same molecule that can be used to prepare the polymerizable mixtures of the present invention include, for example, those represented by the aforementioned Formulas XXXI, XXXII, XXXVI, XXXVII, as well as a compound represented by the following Formula XXXIX

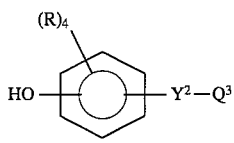

FORMULA XXXIX wherein A, A', A", A¹, R, R¹, Y², n, n', a and m' are as hereinbefore defined, and each Q³ is —CO—OH or —CO—SH.

Suitable compounds which contain a phenolic hydroxyl group and a carboxylic acid or thiocarboxylic acid group in the same molecule include, for example, o-, m-, p-hydroxybenzoic acid, o-, m-, p-hydroxythiobenzoic acid, 4-hydroxy-4'-carboxybiphenyl, 4-hydroxyphenyl-4'-carboxybenzoate, 4-hydroxy-4'-carboxystilbene, 4-hydroxyphenyl-4'-carboxyphenylazomethine, 4-hydroxy-4'-carboxy-alpha-methylstilbene, 4-hydroxy-4'-carboxy-alpha-chlorostilbene, 4-hydroxy-4'-carboxy-alpha-cyanostilbene, 4-carboxymethylphenol, 4-beta-carboxyethylphenol, 4-(1-(3-carboxyphenyl)-1-methylethyl)phenol, 4-(1-(4-carboxyphenyl)-1-methylethyl)phenol, 4-(4-carboxyphenoxy)phenol, 4-((4-carboxyphenyl)thio)phenol, (4-carboxyphenyl)(4-hydroxyphenyl)methanone, 4-((4-carboxyphenyl)sulfonyl)phenol and the like.

Compounds Containing Both an Amino Group and a Carboxylic Acid or Thiocarboxylic Acid Group Suitable For Use in the Polymerizable and Polymerized Compositions Suitable compounds which contain both an amino group and a carboxylic acid or thiocarboyxlic acid group in the same molecule that can be used to prepare the polymerizable mixtures of the present invention include, for example, those represented by the aforementioned Formulas XXXI, XXXII, XXXV, XXXVI, XXXVII, as well as a compound represented by the following Formula XXXX.

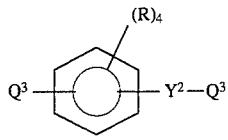

FORMULA XXXX wherein A, A', A", A¹, R, R¹, R⁴, Y², m', a, n and n' are as hereinbefore defined and each Q³ is independently a —NHR⁴, —CO—OH or —CO—SH group.

Suitable compounds which contain an amino group and a carboxylic acid or thiocarboxylic acid group in the same molecule include, for example, o-, m-, p- aminobenzoic acid, o-, m-, p- aminothiobenzoic acid, 4-amino-4'-carboxybiphenyl, 4-aminophenyl-4-carboxybenzoate, 4-amino-4'-carboxystilbene, 4-aminophenyl-4'-carboxyphenylazomethine, 4-amino-4'-carboxy-alpha-methylstilbene, 4-amino-4'-carboxy-alpha-chlorostilbene, 4-aminomethylbenzoic acid, 4-carboxymethylaniline, 4-beta-carboxyethylaniline, 4-(1-(3-carboxyphenyl)-1-methylethyl)aniline, 4-(1-(4-carboxyphenyl)-1-methylethyl)aniline, (4-carboxyphenyl)(4-aminophenyl)methanone, 4-((4-carboxyphenyl)sulfonyl)phenol, 1-amino-4-carboxycyclohexane, 6-aminohexane carboxylic acid and the like.

Materials Containing One Cyclic Imino Ether Group Per Molecule and One or More Mesogenic Moieties Which Can be Employed in the Polymerizable and Polymerized Compositions Suitable materials which contain one or more mesogenic moieties and an average of one cyclic imino ether group per molecule that can be used to prepare the polymerizable mixtures of the present invention include, for example, those represented by the following Formulas XXXXI, XXXXII, XXXXIII, or XXXXIV

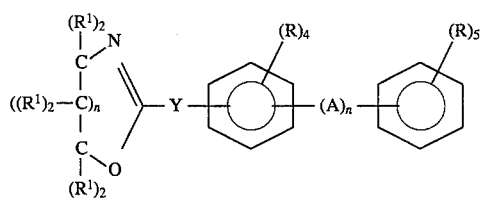

FORMULA XXXXI

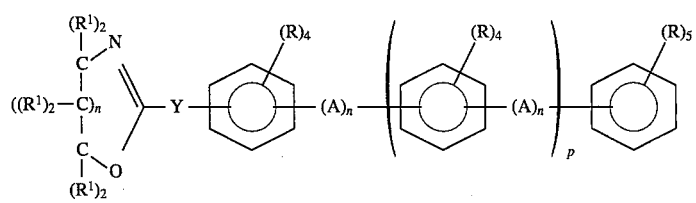

FORMULA XXXXII

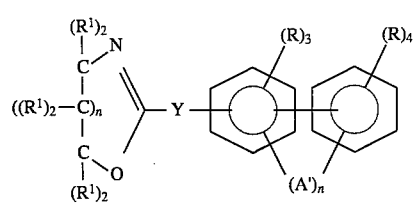

FORMULA XXXXIII

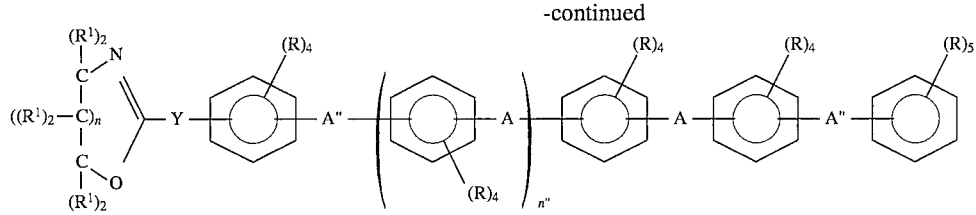

FORMULA XXXXIV wherein at least 80 percent of the —A— linkages, the direct bond in Formula XXXXIII and the Y groups are in the para position with respect to each other and each A, A', A", $A^1$, R, $R^1$, $R^2$, Q, $Q^1$, n, n', n", a, Y Im and p are as hereinbefore defined. The aromatic rings can also contain one or more heteroatoms selected from N, O, S and the like.

Suitable compounds which contain one or more mesogenic moieties and an average of one cyclic imino ether group per molecule represented by Formulas XXXXI, XXXXII, XXXXIII and XXXXIV include, for example

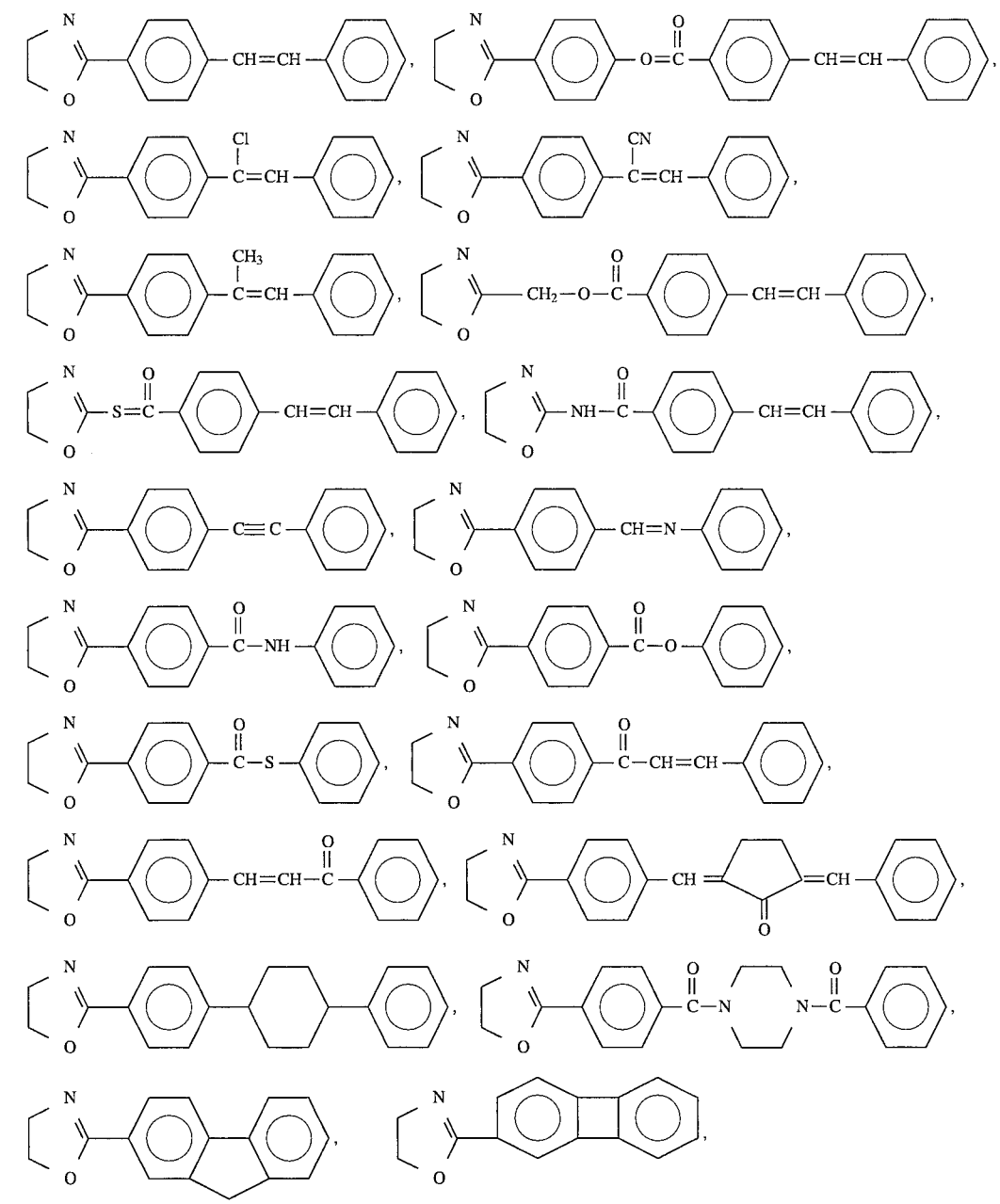

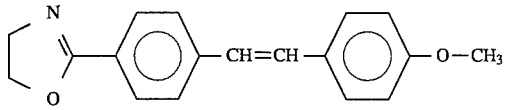

The compounds which contain one or more mesogenic moieties and an average of one cyclic imino ether group per molecule are prepared using the corresponding precursor reactants and the hereinbefore described chemistry for formation of the cyclic imino ethers.

Method For Forming the Mixtures of the Present Invention

The mixtures of the present invention can be prepared by directly combining one or more of the desired component(s) with one or more cyclic imino ether compositions containing one or more mesogenic moieties or by addition of one or more of the desired components to the cyclic imino ether compositions containing one or more mesogenic moieties in increments or stages. When a single component is to be added to the cyclic imino ether compositions containing one or more mesogenic moieties, said component may be prepolymerized (B-staged) or fully homopolymerized, prior to the addition. Additionally, certain of said single components may be homopolymerized (interpolymerized) while dispersed in or mixed in with one or more cyclic imino ether compositions containing one or more mesogenic moieties. When two or more components are to be added to the cyclic imino ether compositions containing one or more mesogenic moieties, said components may be partially or totally copolymerized or reacted together, prior to the addition. Additionally, when two or more components are to be added to the cyclic imino ether containing one or more mesogenic moieties, one component may be prepolymerized or fully homopolymerized in the presence of the other components, prior to the addition. It is understood that one or more catalysts or accelerators may be included where desired to facilitate the aforementioned copolymerization, interpolymerization, prepolymerization, homopolymerization or reaction of one or more specific components.

The mixtures of the polymerizable cyclic imino ether compositions containing one or more mesogenic moieties (component A) and the components B-1 to B-12 can contain any amounts of components A and B. Suitably, the components are employed in amounts such that the mixture contains from about 1 to about 99, preferably from about 25 to about 95, more preferably from about 40 to about 60 percent by weight of component A based on the combined weight of components A and B; and from about 99 to about 1, preferably from about 75 to about 5, more preferably from about 50 to about 10 percent by weight based on the combined weight of components A and B.

Polymerization of the Polymerizable Mixtures

The mixtures of the present invention may be polymerized by heating from about 30° C. to about 450° C., preferably by heating from 50° C. to 300° C., optionally in the presence of one or more suitable catalysts. In addition to the catalysts previously delineated for the polymerization of cyclic imino ether compositions, whenever one or more polymaleimides are present in the polymerizable mixtures, it is often desireable to utilize one or more free radical forming catalysts for the purpose of polymerizing all or a part of the unsaturated groups present in said polymaleimide(s). Said free radical forming catalysts include the organic peroxides and hydroperoxides as well as the azo and diazo compounds. Preferred free radical forming catalysts include benzoylperoxide, t-butylhydroperoxide, t-butylperoxybenzoate, azobisisobutyronitrile, dicumylperoxide, di-tert-butylperoxide and cumene hydroperoxide. The quantity of catalyst used, if any, depends on the structure of the particular catalyst, the structure of the components used in the polymerizable mixture, the cure structure desired, the cure time, the cure temperature, and the like. Generally, catalyst concentrations of from about 0.001 to about 2 percent by weight are preferred. B-staging or prepolymerization of the mixtures of the present invention can be accomplished by using lower temperatures and/or shorter curing times. Curing of the thus formed B-staged (prepolymerized) mixture can then be accomplished at a later time or immediately following B-staging (prepolymerization) by increasing the temperature and/or curing time.

The polymerized mixtures possess a variety of curing structures which depend, in part, upon the amounts and types of individual components used to prepare said mixture, the sequence of component addition and procedure used to prepare said mixture, the amounts and types of catalysts, if any, employed, the reaction times and temperatures, and the like.

Mixtures of (A) one or more cyclic imino ether compositions containing one or more mesogenic moieties and no other moieties reactive with the cyclic imino ether group with (B-1) one or more cyclic imino ether compositions which do not contain mesogenic moieties and/or prepolymers of either of the aforementioned types of cyclic imino ether compositions undergo ring-opening copolymerization initiated by the hereinbefore described cation-active catalysts to provide highly crosslinked copoly(N-acylalkylenimine)s containing mesogenic moieties. As a preferred embodiment of the present invention, addition of about 10 percent or more of a cyclic imino ether composition containing one or more mesogenic moieties to a cyclic imino ether composition which does not contain mesogenic moieties followed by polymerizing provides a copoly(N-acylalkylenimine) with improved mechanical properties over those of the poly(N-acylalkylenimine) obtained from curing or polymerizing of only the cyclic imino ether composition which does not contain mesogenic moieties.

Mixtures of (A) one or more cyclic imino ether compositions containing one or more mesogenic moieties and no other moieties reactive with the cyclic imino ether group with (B-2) one or more epoxy resins polymerize to produce a complex structure. 2-Monooxazolines without active groups in the 4 and 5 positions react with epoxides to form the 1-aza-4,6 dioxabicyclo[3.3.0]octane structure. Thus, R. Feinauer and W. Seeliger, Justus Liebigs Annalen Chem., Volume 698, pages 174–179 (1966) report that reaction of ethylene oxide with 2-phenyl-2-oxazoline provides 1-aza-5-phenyl-4,6-dioxabicyclo[3.3.0]octane in the presence of lithium chloride catalyst. U.S. Pat. No. 3,630,996 teaches copolymerization of certain 2,2'-bis(2-oxazoline)s and oxazines with certain epoxy resins, such as the diglycidyl ether of bisphenol A. The copolymerization forms 1-aza-4, 6-dioxabicyclo[3.3.0]octane structure when epoxy resin and 2,2'-bis(2-oxazoline) reactants are employed. According to the teachings of U.S. Pat. No. 4,628,102, increasing the mole ratio of epoxide to oxazoline groups can be done to provide a product containing the 1-aza- 4,6-dioxabicyclo[3.3.0]octane structure (bicyclic amide acetal) and unreacted epoxide groups. According to the teachings of U.S. Pat. No. 3,630, 996, the 1-aza-4,6-dioxabicyclo[3.3.0]octane structure catalyzes the self-cure of epoxy resins to provide a polyether cure structure. Thus, mixtures of oxazoline (oxazine) and epoxy resin containing as little as 25 equivalent percent oxazoline can be used to provide a cured product. A preferred embodiment of the present invention is the polymerization product of a cyclic imino ether composition containing one or more mesogenic moieties with an epoxy resin containing one or more mesogenic moieties. The aforementioned polymerized product provides improved properties, notably increased glass transition temperature, relative to the polymerization product of a cyclic imino ether compositions which does not contain mesogenic moieties with an epoxy resin which does not contain mesogenic moieties. Methods for the polymerization of bis(2-oxazolines) and oxazines which do not contain mesogenic moieties with epoxy resins are taught by the aforementioned Feinauer and Seeliger reference, as well as U.S. Pat. Nos. 3,630,996; 4,628,102; 4,605,746; 3,639,395; 3,763,177; 3,784,508; 3,822,237; 3,730,915; 4,652,620 which are incorporated herein by reference.

Mixtures of (A) one or more cyclic imino ether compositions containing one or more mesogenic moieties and no other moieties reactive with the cyclic imino ether group with (B-3) one or more polymaleimides can polymerize to produce a complex structure. D. M. Wilson and S. J. Huang, Polymeric Materials: Science and Engineering, volume 60, pages 88–92 (1989) report that copolymerization of N-phenylmaleimide and 2-ethyl-2-oxazoline occurs via an initial complex which forms a dimer, 1-ethylcarbonyl,5-phenyl-1,5-diaza-[3.3.0] bicylooctane-4,6-dione upon heating. Further heating provides a copolymer containing the following structure

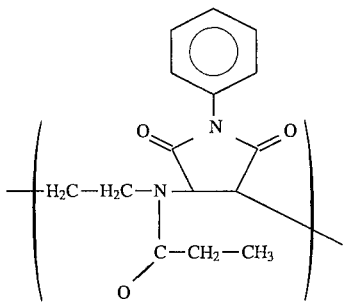

Totally crosslinked systems were also produced via copolymerization of 2,2'-(1,5-pentyl)-bis(2-oxazoline) with several different bismaleimides.

Thus, the maleimide group homopolymerization structure,

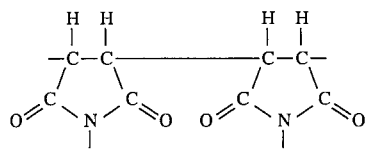

as well as the cyclic imino ether and maleimide copolymerization structure,

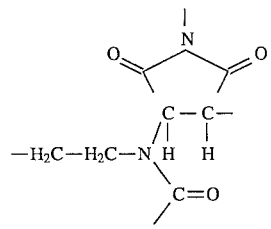

may be present in the polymaleimide and poly(2-oxazoline) copolymerization products of the present invention.

Increasing the mole ratio of maleimide groups to cyclic imino ether groups can be done to provide a product with an increase in the relative amount of maleimide group homopolymerization structure in the copolymer product. A preferred embodiment of the present invention is the polymerization product of a cyclic imino ether composition containing one or more mesogenic moieties with a polymaleimide containing one or more mesogenic moieties. The aforementioned polymerized product provides improved mechanical properties relative to the polymerization product of a cyclic imino ether composition which does not contain mesogenic moieties with a polymaleimide which does not contain mesogenic moieties. Methods for the copolymerization of mono and bis(2-oxazolines) which do not contain mesogenic moieties with polymaleimides are taught by the aforementioned Wilson and Huang reference, as well as D. M. Wilson and S. J. Huang, Polymeric Materials: Science and Engineering, volume 58, pages 570–574 (1988) and D. M. Wilson and S. J. Huang, Polymer Preprints, volume 28, number 1, pages 73–74 (April, 1987) which are incorporated herein by reference.

Mixtures of (A) one or more cyclic imino ether compositions containing one or more mesogenic moieties and no other moieties reactive with the cyclic imino ether group with (B-4) one or more polyamines react in various ways depending upon the structure of the reactants employed. For example, research by K. Kormendy, P. Sohar and J. Volford summarized in Chemical Abstracts 58:12,805 (1963) shows that 2-phenyl-2-oxazoline and aniline hydrochloride react to provide 2-phenylamino-2-phenyloxazolidine. M. T. Leffler and B. Adams, Journal of the American Chemical Society, Volume 59, Pages 2252–2258 (1937) report that reaction of 2-p-chloromethyl-phenyl-2-oxazoline with excess diethylamine at 100° C. provides 2-p-diethylaminomethylphenyl-2-oxazoline. A preferred embodiment of the present invention is the polymerization product of a cyclic imino ether composition containing one or more mesogenic moieties with a combination of a polyamine and an epoxy resin. Methods for reaction of polymerizable mixtures comprising a cyclic imino ether composition, a polyamine and an epoxy resin generally parallel those methods taught herein for reaction of a cyclic imino ether composition and an epoxy resin.

Mixtures of (A) one or more cyclic imino ether compositions containing one or more mesogenic moieties and no other moieties reactive with the cyclic imino ether group with (B-5) one or more polyphenols or polythiophenols using a 1 to 1 mole ratio of cyclic imino ether groups to phenolic hydroxyl (thiophenol) groups polymerize to produce poly(etheramide)s (poly(thioetheramides)s). A preferred embodiment of the present invention is the polymerization product of a cyclic imino ether composition containing one or more mesogenic moieties with a combination of a polyphenol and an epoxy resin. Methods for the reaction of polyphenol compounds with bis(2-oxazoline)s which do not contain mesogenic moieties to produce poly-(etheramide)s are taught by U.S. Pat. No. 4,430,491 and by T. Nishikubo, T. Iizawa and M. Watanabe, Journal of Polymer Science: Polymer Letters Edition, volume 18, pages 761–764 (1980) which are incorporated herein by reference.

Mixtures of (A) one or more cyclic imino ether compositions containing one or more mesogenic moieties and no other moieties reactive with the cyclic imino ether group with (B-6) one or more polycarboxylic acids or polythiocarboxylic acids using a 1 to 1 mole ratio of cyclic imino ether groups to carboxylic acid (thiocarboxylic acid) groups polymerize to produce poly(esteramide)s (poly(thioesteramides)s). A preferred embodiment of the present invention is the polymerization product of a cyclic imino ether composition containing one or more mesogenic moieties with a combination of a polycarboxylic acid and an epoxy resin. Methods for the reaction of bis(2-oxazoline)s which do not contain mesogenic moieties with polycarboxylic acids to produce poly(esteramide)s are taught by T. Kagiya, S. Narisawa, T. Maeda and K. Fukui, Journal of Polymer Science: Polymer Letters Edition, volume 4, pages 257–260 (1966) which is incorporated herein by reference.

Mixtures of (A) one or more cyclic imino ether compositions containing one or more mesogenic moieties and no other moieties reactive with the cyclic imino ether group with (B-7) one or more compounds which simultaneously contain both a phenolic hydroxyl or thiophenolic sulfhydryl group and an amino group or (B-8) one or more compounds which simultaneously contain both a phenolic hydroxyl or thiophenolic sulfhydryl group and a carboxylic acid or thiocarboxylic acid group or (B-9) one or more compounds which simultaneously contain both an amino group and a carboxylic acid or thiocarboxylic acid group can polymerize to produce a complex variety of structures, including those previously mentioned for the various respective functional groups. As a specific example, a preferred mixture of the present invention consists of the cooligomerization product of (B-8) one or more compounds which simultaneously contain both a phenolic hydroxyl or thiophenolic sulfhydryl group and a carboxylic acid or thiocarboxylic acid group with (B-2) one or more epoxy resins. This cooligomer is an advanced epoxy resin which is then polymerized with (A) one or more cyclic imino ether compositions containing one or more mesogenic moieties.

Mixtures of (A) one or more cyclic imino ether compositions containing one or more mesogenic moieties with (B-10) one or more materials which contain one or more mesogenic moieties per molecule and on the average only one cyclic imino ether group per molecule can be copolymerized using the previously described methods for polymerization of the cyclic imino ether compositions. Ring-opening polymerization of these cyclic imino ether-containing mixtures initiated by cation-active catalysts provides poly(N-acylalkylenimine)s containing mesogenic moieties, providing that no other moieties reactive with cyclic imino ether groups are present in (A) or (B-10). Increasing the amount of the aforementioned cyclic imino ether compound containing an average of one cyclic imino ether group per molecule with respect to the amount of polyfunctional cyclic imino ether compositions can be used as a convenient method for lowering the crosslink density of the copolymerization product thereof.

Orientation of the Polymerized Product Containing Mesogenic Moieties

During processing and/or curing of the cyclic imino ether compositions containing one or more mesogenic moieties or the mixtures containing said cyclic imino ether compositions, electric or magnetic fields or shear stresses can be applied for the purpose of orienting the mesogenic moieties contained or developed therein. As specific examples of these methods, Finkelmann, et. al., *Macromol. Chem.*, 180, 803–806 (March, 1979), incorporated herein by reference, induced orientation in an electric field, of thermotropic methacrylate copolymers containing mesogenic side chain groups decoupled from the main chain via flexible spacers. Orientation in a magnetic field of mesogenic side chain groups decoupled from the main chain via flexible spacers has been demonstrated by Roth and Kruecke, *Macromol. Chem.*, 187, 2655–2662 (November, 1986) which is incorporated herein by reference. Magnetic field induced orientation of mesogenic main chain containing polymers has been demonstrated by Moore, et. al., *ACS Polymeric Material Sciences and Engineering*, 52, 84–86 (April–May, 1985) which is incorporated herein by reference. Magnetic and electric field induced orientation of low molecular weight mesogenic compounds is discussed by W. Krigbaum in *Polymer Liquid Crystals*, pages 275–309 (1982), published by Academic Press, Inc., and is incorporated herein by reference. The use of shear to induce orientation is also discussed therein. When the curing is to be performed in an electric or magnetic field, it is frequently of value to conduct simple preliminary experiments that allow for balancing of cure kinetics versus induction of orientation under the particular experimental conditions being employed (i.e. catalyst(s) level being used, temperature used, inherent dielectric (diamagnetic) susceptibility of the specific mesogenic moieties used, etc.). This is done recognizing the relatively greater ease of inducing orientation in low molecular weight materials versus polymeric materials containing mesogenic moieties.

In addition to orientation by electric or magnetic fields, the cyclic imino ether compositions containing one or more mesogenic moieties or mixtures containing said cyclic imino ether compositions can be oriented by shear forces which are induced by flow through dies, orifices and mold gates. A general discussion of orientation of thermotropic liquid crystalline polymers by this method is given by S. K. Garg and S. Kenig in *High Modulus Polymers*, pages 71–103 (1988) published by Marcel Dekker, Inc. which is incorporated herein by reference. For the mesomorphic ether compositions or mixtures containing said cyclic imino ether compositions, this shear orientation can conveniently be produced by or during processing methods such as injection molding, extrusion, pultrusion, filament winding, filming and prepreging.

Other Components Which Can be Employed

The cyclic imino ether compositions containing one or more mesogenic moieties or mixtures containing said cyclic imino ether compositions can be blended with other materials such as solvents or diluents, fillers including those comprising a liquid crystalline polymer, pigments, dyes, flow modifiers, thickeners, reinforcing agents, mold release agents, wetting agents, stabilizers, fire retardant agents, surfactants, low profile additives, shrinkage control agents, other resinous products, combinations thereof and the like.

These additives are added in functionally equivalent amounts, e.g., the pigments and/or dyes are added in quantities which will provide the composition with the desired color; however, they are suitably employed in amounts of from about zero to about 20, more suitably from about 0.5 to about 5, most suitably from about 0.5 to about 3 percent by weight based on the total weight of the composition.

Solvents or diluents which can be employed herein include, for example, hydrocarbons, ketones, aliphatic ethers, cyclic ethers, esters, chlorinated hydrocarbons, combinations thereof and the like. Particularly suitable solvents or diluents include, for example, toluene, xylenes, methylethyl ketone, methylisobutyl ketone, methylamyl ketone, chloroform, acetone, perchloroethylene, methylene chloride, tetrahydrofuran, 1,4-dioxane, ethyl acetate, butyl acetate, combinations thereof and the like.

The modifiers such as thickeners, flow modifiers, shrinkage control agents, low profile additives and the like can be suitably employed in amounts from about 0.05 to about 15, more suitably from about 0.1 to about 10, most suitably from about 0.1 to about 5 percent by weight based on the total weight of the composition.

Reinforcing materials which can be employed herein include natural and synthetic fibers in the form of woven fabric, mats, monofilament, multifilament, unidirectional fibers, rovings, random fibers or filaments, inorganic fillers or whiskers, hollow spheres, and the like. Suitable reinforcing materials include glass, ceramics, nylon, rayon, cotton, aramid, graphite, polyalkylene terephthlates, polyethylene, polypropylene, polyesters, carbon, boron, asbestos, combinations and hybrids thereof and the like.

Suitable fillers which can be employed herein include, for example, inorganic oxides, ceramic microspheres, plastic microspheres, glass microspheres, inorganic whiskers, calcium carbonate, graphite powder, sand, metal powders, combinations thereof and the like. The fillers can be employed in amounts from about 0.1 to about 95, more suitably from about 5 to about 80, most suitably from about 10 to about 50 percent by weight of the total composition.

Uses for the Compositions

The compositions of the present invention can be employed in the preparation of laminates, prepregs, composites, coatings, castings, pultruded products, filament wound products, films, molding and potting formulations, extruded products, injection molded products, and the like.

The following examples are illustrative of the invention but are not to be construed as to limiting the scope thereof in any manner.

EXAMPLE 1

A. Synthesis of bis(β-hydroxyethylamide) of 4,4'-Stilbenedicarboxylic Acid

Dimethyl ester of 4,4'-stilbenedicarboxylic acid (59.26 grams, 0.20 mole), and monoethanolamine (366.4 grams, 6.0 moles) are added to a reactor equipped with a chilled glycol condenser and stirred under a nitrogen atmosphere to provide a slurry. Heating commences and provides a clear solution once 168° C. is achieved. After 110 minutes at 168°–170° C., the stirred solution becomes hazy. After an additional 280 minutes at 170° C., the stirred hazy solution is cooled to 35° C., then diluted with methylene chloride (500 milliliters) and stirred to a homogeneous, boiling slurry. The slurry is filtered and the product recovered from the filter is again stirred into methylene chloride (500 milliliters) and boiled. After filtration the product recovered from the methylene chloride slurry is washed on the filter with two portions (100 milliliters) of methylene chloride. The product from the filter is added to a porcelain dish and dried in a vacuum oven at 80° C. and 1 mm Hg to a constant weight of 61.9 grams of crystalline white powder. Fourier transform infrared spectrophotometric analysis of a potassium bromide pellet of the product reveals the presence of the expected secondary amide N—H stretching (solid state) at 3363 $cm^{-1}$ as a shoulder, the secondary amide carbonyl stretching (solid state) at 1636 $cm^{-1}$ (sharp), the hydroxyl group O—H stretching centered at 3289 $cm^{-1}$ (broad) and the ethylene C—H out-of-plane deformation at 965 $cm^{-1}$, concurrent with complete disappearance of any ester carbonyl stretching. High pressure liquid chromatographic analysis (ultraviolet absorbance detector) of a portion of the product confirms the presence of a single product peak.

B. Conversion of bis(β-hydroxyethylamide) of 4,4-Stilbenedicarboxylic Acid to the bis(Oxazoline)

A portion (17.72 grams, 0.10 hydroxyl equivalent) of bis(β-hydroxyethylamide) of 4,4-stilbenedicarboxylic acid from A. above is added to a reactor and stirred as a dry powder under a nitrogen atmosphere. Thionyl chloride (237.94 grams, 2.0 moles) is added to the reactor and immediately forms a stirred solution. After three minutes of stirring, the solution becomes a thick light yellow colored slurry. After an additional two minutes, the slurry exotherms to a maximum temperature of 38° C. and stirring ceases. At this time, the slurry is diluted with ethyl acetate (250 milliliters) and stirring resumes to provide a fine suspension of powder. After a total of ten minutes stirring of the suspension, the product is filtered off and the product recovered on the filter is washed with ethyl acetate (100 milliliters). The filter cake of bis(β-chloroethylamide) of 4,4'-stilbenedicarboxylic acid slightly damp with ethyl acetate is added to a beaker containing deionized water (1800 milliliters) and stirred to a homogeneous slurry. Five percent aqueous sodium hydroxide solution is added dropwise to the light yellow colored slurry until the pH reached 6–7. At this time, a white slurry of product is formed and is stirred for an additional ten minutes before filtration. The product is washed on the filter with deionized water (250 milliliters), removed, added to a porcelain dish and then dried in a vacuum oven at 70° C. and 1 mm Hg to a constant weight of 15.14 grams of crystalline white powder. Fourier transform infrared spectrophotometric analysis of a potassium bromide pellet of the product reveals the presence of the expected oxazoline >C=N— absorbance at 1643 $cm^{-1}$, the ethylene C—H out-of-plane deformation at 972 $cm^{-1}$ and the out-of-plane C—H bending vibration at 852 $cm^{-1}$ indicative of para-disubstitution, concurrent with complete disappearance of secondary amide N—H stretching, the secondary amide carbonyl stretching and the hydroxyl group O—H stretching. An absorption characteristic of the oxazoline ring is observed at 945 $cm^{-1}$. Proton magnetic resonance spectroscopy (250 MHz) further confirms the product structure as the bis(oxazoline).

C. Characterization of the bis(Oxazoline) for Liquid Crystallinity

A portion (18.1 milligrams) of the bis(oxazoline) of the bis(β-chloroethylamide) of 4,4'-stilbenedicarboxylic acid from B. above is analyzed by differential scanning calorimetry using a heating rate of 10° C. per minute under a stream of nitrogen flowing at 35 cubic centimeters per minute and a temperature range from 30° to 350° C. A pair of sharp endotherms are obtained with an onset temperature of 290.1° C., minima at 294° and 304° C., respectively, and a collective enthalpy of 44.7 joules per gram. The latter endothermic event is followed by an exotherm with a maximum at 321.8° C., an endpoint temperature of 334° C. and an enthalpy of 105.5 joules per gram. A second scanning reveals complete loss of both of the aforementioned endothermic events, with exothermic activity beginning at 325.6° C. Analysis of a portion of the bis(oxazoline) via crosspolarized light microscopy is completed using a microscope equipped with a programmable hot stage using a heating rate of 10° C. per minute and 70× magnification. At 300° C., a partial melt of the compound is observed followed by a change in color to yellow brown. Large crystals forming on the microscope slide and coverslip appear to result from sublimation.

EXAMPLE 2

Preparation and Copolymerization of bis(Oxazoline) and Diglycidyl Ester Blend

A portion (0.1575 gram, 0.00099 oxazoline equivalent) of the bis(oxazoline) of the bis(β-chloroethylamide) of 4,4'-stilbenedicarboxylic acid from Example 1-B and diglycidyl ester of 4,4'-stilbenedicarboxylic acid having an epoxide equivalent weight (EEW) of 198.41 (0.1963 gram, 0.00099 epoxide equivalent) are added to an agate mortar and ground together until a homogeneous powder is formed. A portion (17.6 milligrams) of the bis(oxazoline) and diglycidyl ester blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 123.3° C., a minimum at 133.1° C., an endpoint temperature of 144° C. and an enthalpy of 40.0 joules per gram. This endothermic event is followed by a gradual exothermic climb with an onset temperature of 181° C., a pair of maxima at 239.5° and 273.8° C., respectively, and an endpoint temperature of 292.6° C. A second scanning reveals a glass transition temperature of 174.9° C. with further exothermic activity beginning at 267.1° C.

Analysis of a portion of the bis(oxazoline) and diglycidyl ester blend via crosspolarized light microscopy is completed using a microscope equipped with a programmable hot stage using a heating rate of 10° C. per minute and 70× magnification. The following results are obtained:

| Observed Transition Temperature (°C.) | Comments |
| --- | --- |
| 30 | Birefringent solid. |
| 128 | First melting. |
| 131 | Crystals dispersed in melt. |
| 225 | Clearing of dispersed crystals observed. |
| 260 | Almost all crystals dissolved in melt. |
| 265 | Thermosets with liquid crystalline texture. Only a trace of crystals observed. |

When cooled to room temperature (24° C.), the thermoset product exhibited large regions having liquid crystalline textures.

EXAMPLE 3

Preparation and Copolymerization of bis(Oxazoline), Diglycidyl Ester and 4,4'-Diaminostilbene Blend A portion (0.1647 gram, 0.00103 oxazoline equivalent) of the bis(oxazoline) of the bis(β-chloroethylamide) of 4,4'-stilbenedicarboxylic acid from Example 1-B, diglycidyl ester of 4,4'-stilbenedicarboxylic acid having an epoxide equivalent weight (EEW) of 198.41 (0.2737 gram, 0.00138 epoxide equivalent) and 4,4'-diaminostilbene (0.0181 gram, 0.00035 —NH equivalent) are added to a ceramic mortar and ground together until a homogeneous powder is formed. A portion (9.6 milligrams) of the bis(oxazoline), diglycidyl ester and diamine blend is analyzed by differential scanning calorimetry using a heating rate of 10° C. per minute under a stream of nitrogen flowing at 35 cubic centimeters per minute and a temperature range from 30° to 300° C. An endotherm is obtained with an onset temperature of 121.6° C., a minimum at 132.6° C., an endpoint temperature of 142° C. and an enthalpy of 32.4 joules per gram. This endothermic event is followed by a gradual exothermic climb with an onset temperature of 181° C., a pair of maxima at 225.2° and 275.9° C., respectively, and an endpoint temperature of 293° C. A second scanning reveals a glass transition temperature of 183.6° C. with further exothermic activity beginning at 265° C.

Analysis of a portion of the bis(oxazoline), diglycidyl ester and diamine blend via crosspolarized light microscopy is completed using a microscope equipped with a programmable hot stage using a heating rate of 10° C. per minute and 70× magnification. The following results are obtained:

| Observed Transition Temperature (°C.) | Comments |
| --- | --- |
| 30 | Birefringent solid. |
| 124 | First melting. |
| 130 | Crystals dispersed in melt. |
| 200 | Clearing of dispersed crystals observed. |
| 220 | Almost all crystals dissolved in melt. |
| 225 | Isotropization complete with thermosetting after 30 seconds at 225° C. |

When cooled to room temperature (24° C.), the thermoset product exhibited dispersed birefringent particles with a crystalline appearance.

Analysis of a second portion of the bis(oxazoline), diglycidyl ester and diamine blend via crosspolarized light microscopy is completed using a microscope equipped with a programmable hot stage preheated to 200° C. and 70× magnification. After five minutes at 200° C., the isotropic fluid became viscous with the appearance of a second dispersed phase. After an additional minute, thermosetting occurred to provide a solid with dispersed birefringent domains possessing liquid crystalline texture.

EXAMPLE 4

Preparation and Copolymerization of bis(Oxazoline) and 4,4'-Diaminostilbene Blend A portion (0.1905 gram, 0.0012 oxazoline equivalent) of the bis(oxazoline) of the bis(β-chloroethylamide) of 4,4'-stilbenedicarboxylic acid from Example 1-B and 4,4'-diaminostilbene (0.1258 gram, 0.0012 —NH$_2$ equivalent) are added to a ceramic mortar and ground together until a homogeneous powder is formed. A portion (11.9 milligrams) of the bis(oxazoline) and diamine blend is analyzed by differential scanning calorimetry using a heating rate of 10° C. per minute under a stream of nitrogen flowing at 35 cubic centimeters per minute and a temperature range from 30° to 300° C. An exotherm is obtained with an onset temperature of 152.3° C., a maximum at 197.5° C., an endpoint temperature of 224.2° C. and an enthalpy of 74.6 joules per gram. A second exotherm is obtained with an onset temperature of 224.2° C., a maximum at 233.2° C., an endpoint temperature of 292° C. and an enthalpy of 54.5 joules per gram. A second scanning reveals a no glass transition temperature or other events up to 300° C. A repeat of the aforementioned differential scanning calorimetry analysis, with increase of the final temperature range from 300° to 400° C. for the second scan, revealed no glass transition temperature up to 363.7° C. At this temperature, a minor exotherm began with a maximum at 385.5° C., an endpoint temperature at 390° C. and an enthalpy of 15.1 joules per gram. Fourier transform infrared spectrophotometric analysis of a potassium bromide pellet of the copolymerization product recovered from this second scan of the differential scanning calorimetry analysis revealed the presence of amide carbonyl stretching at 1649 cm$^{-1}$ with retention of the ethylene C—H out-of-plane deformation at 965 cm$^{-1}$ and the out-of-plane C—H bending vibration at 826 cm$^{-1}$ indicative of para-disubstitution, concurrent with complete disappearance of the absorbance at 945 cm$^{-1}$ characteristic of the oxazoline ring.

Analysis of a portion of the bis(oxazoline) and diamine blend via crosspolarized light microscopy is completed using a microscope equipped with a programmable hot stage using a heating rate of 10° C. per minute and 70× magnification. The following results are obtained:

| Observed Transition Temperature (°C.) | Comments |
| --- | --- |
| 30 | Birefringent solid. |
| 240 | Solid darkens |
| 280 | Brown birefringent solid. |

When cooled to room temperature (24° C.), the product retained its birefringent appearance.

Analysis of a second portion of the bis(oxazoline) ester and diamine blend via crosspolarized light microscopy is completed using a microscope equipped with a programmable hot stage preheated to 280° C. and 70× magnification. The blend melted at the 280° C. temperature with the appearance of liquid crystal textures then instantly solidified with retention of the liquid crystal type textures.

EXAMPLE 5

A. Synthesis of 2-(4-Hydroxyphenyl)oxazoline

Phenyl ester of 4-hydroxybenzoic acid (19.28 grams, 0.09 mole) and monoethanolamine (5.55 grams, 0.0909 mole) are added to a reactor and stirred as a powder under a nitrogen atmosphere. Heating commences and fourteen minutes later, a temperature of 150° C. is achieved. After 108 minutes at 150° C., the reactor is cooled to 60° C., then chloroform (100 milliliters) is added. After boiling for 5 minutes, the chloroform is decanted off, and a second portion (100 milliliters) of chloroform is added. After boiling for 5 minutes, the chloroform is again removed by decantation. A third portion (100 milliliters) of chloroform is added followed by boiling for 5 minutes and decantation. Ethyl acetate (100 grams) is added to the powder product remaining in the reactor and stirring under a nitrogen atmosphere commences to provide a fine slurry. Thionyl chloride (21.41 grams, 0.18 mole) dissolved in ethyl acetate (50 grams) is added to the reactor inducing an exotherm to 29° C. three minutes later. The reactor is allowed to cool to 25° C. and maintained therein for 237 minutes. The product is filtered off and the product recovered on the filter is washed with two portions (50 milliliters) of ethyl acetate. The filter cake of N-(2-chloroethyl)-4-hydroxybenzamide slightly damp with ethyl acetate is added to a beaker containing deionized water (300 milliliters) and stirred to a solution. Five percent aqueous sodium hydroxide solution is added dropwise to the solution until the pH reached 7. At this time, a white slurry of crystalline product is formed and is stirred for an additional ten minutes before filtration. The product is washed on the filter with two portions (50 milliliters) of deionized water, removed, added to a porcelain dish and then dried in a vacuum oven at 50° C. and 1 mm Hg for two hours. After this time, the product is removed and boiled in acetone (300 milliliters). After cooling to 25° C., 200 milliliters of the acetone is removed by rotary evaporation. The resulting product is recovered by filtration, washed on the filter with cold acetone (25 milliliters), removed, added to a porcelain dish and then dried in a vacuum oven at 50° C. and 1 mm Hg to a constant weight of 9.02 grams of crystalline white powder. Fourier transform infrared spectrophotometric analysis of a potassium bromide pellet of the product reveals the presence of the expected oxazoline >C=N— absorbance at 1636 cm$^{-1}$, the hydroxyl group O—H stretching at 3442 cm$^{-1}$ and the out-of-plane C—H bending vibration at 839 cm$^{-1}$ indicative of para-disubstitution. An absorption characteristic of the oxazoline ring is observed at 945 cm$^{-1}$. Proton magnetic resonance spectroscopy (250 MHz) further confirms the product structure as the 2-(4-hydroxyphenyl)oxazoline.

B. Conversion of 4,4'-Stilbenedicarboxylic Acid to the Diacid Chloride and Coupling with 2-(4-Hydroxyphenyl)-oxazoline 4,4'-stilbenedicarboxylic acid (2.683 grams, 0.02 —COOH equivalent) and thionyl chloride (118.97 grams, 1.0 mole) are added to the reactor and stirred under a nitrogen atmosphere. After three minutes of stirring, heating of the slurry commences and ten minutes later, a reflux temperature of 78° C. is achieved. After ten hours at reflux temperature, the solution is cooled to 35° C., then vacuum distillation to remove thionyl chloride from the reactor commences. The 4,4'-stilbenedicarboxylic acid chloride product remains in the reactor as a light yellow colored powder after removal of the thionyl chloride is complete. 1,4-dioxane (500 milliliters) is added to the diacid chloride followed by heating and stirring under a nitrogen atmosphere to 45° C. At this temperature, a solution forms and is then cooled to 35° C. 2-(4-hydroxyphenyl)oxazoline (3.26 grams, 0.02 hydroxyl equivalent) is added to the reactor and stirring at the 35° C. temperature continues for fifteen minutes to again provide a solution. At this time, triethylamine (2.23 grams, 0.022 mole) is added to the reactor while maintaining the 35° C. temperature. Within five minutes after the triethylamine addition, the solution becomes an opaque slurry. Two hours after the triethylamine addition, the slurry is cooled to 25° C., followed by filtration. The product recovered on the filter is washed with three portions (50 milliliters) of deionized water, removed, added to a porcelain dish and then dried in a vacuum oven at 50° C. and 1 mm Hg to a constant weight. After this time, the product is removed and boiled in chloroform (1500 milliliters). Chloroform solution is recovered by filtration then rotary evaporated at 50° C. and 1 mm Hg final conditions to a constant weight of 4.90 grams of crystalline white powder. Fourier transform infrared spectrophotometric analysis of a potassium bromide pellet of the product reveals the presence of the expected oxazoline >C=N— absorbance at 1649 cm$^{-1}$, the ester carbonyl stretching at 1736 cm$^{-1}$, the ethylene C—H out-of-plane deformation at 972 cm$^{-1}$ and the out-of-plane C—H bending vibration at 852 cm$^{-1}$ indicative of para-disubstitution, concurrent with complete disappearance of carboxylic acid chloride carbonyl stretching and the hydroxyl group O—H stretching. An absorption characteristic of the oxazoline ring is observed at 945 cm$^{-1}$. Proton magnetic resonance spectroscopy (250 MHz) further confirms the product structure as the bis(oxazoline).

C. Characterization of the bis(Oxazoline) for Liquid Crystallinity

A portion (7.1 milligrams) of the bis(oxazoline) formed by coupling of 4,4'-stilbenedicarboxylic acid chloride and 2-(4-hydroxyphenyl)oxazoline from B. above is analyzed by differential scanning calorimetry using a heating rate of 10° C. per minute under a stream of nitrogen flowing at 35 cubic centimeters per minute and a temperature range from 30° to 400° C. The following results are obtained:

| Observed Transition Temperatures (°C.) midpoint/onset - end | Enthalpy (J/g) | Comments |
| --- | --- | --- |
| 237.3/230.2–243 | 2.56 | Exotherm |
| 257.1/243–265 | 3.86 | Endotherm |
| 300.9 and 320.1/285.4–337 | 78.3 | Pair of exotherms |

An endotherm with a minimum at 363.9° C. immediately follows the 337° C. endpoint and is followed by an exotherm with a 377.7° C. maximum.

Analysis of a portion of the bis(oxazoline) via crosspolarized light microscopy is completed using a microscope equipped with a programmable hot stage using a heating rate of 20° C. per minute and 70× magnification. The following results are obtained:

| Observed Transition Temperature (°C.) | Comments |
| --- | --- |
| 30 | Birefringent solid. |
| 260 | First melting, highly birefringent, |
| 280 | Melted material has resolidified. |
| 300 | Semi-solid with liquid crystal textures. |

When cooled to room temperature (24° C.), liquid crystalline textures were observed in the product.

EXAMPLE 6

Preparation and Copolymerization of bis(Oxazoline) and Diglycidyl Ester Blend

A portion (0.0671 gram, 0.00024 oxazoline equivalent) of the bis(oxazoline) formed by coupling of 4,4'-stilbenedicarboxylic acid chloride and 2-(4-hydroxyphenyl)oxazoline from Example 5-B and the diglycidyl ester of 4,4'-stilbenedicarboxylic acid having an epoxide equivalent weight (EEW) of 198.41 (0.0477 gram, 0.00024 epoxide equivalent) are added to an agate mortar and ground together until a homogeneous powder is formed. A portion (12.4 milligrams) of the bis(oxazoline) and diglycidyl ester blend is analyzed by differential scanning calorimetry using a heating rate of 10° C. per minute under a stream of nitrogen flowing at 35 cubic centimeters per minute and a temperature range from 30° to 400° C. An endotherm is obtained with an onset temperature of 120° C., a minimum at 132° C., an endpoint temperature of 143° C. and an enthalpy of 27.3 joules per gram. This endothermic event is followed by a gradual exothermic climb with an onset temperature of 177° C. a maximum at 285.2° C. and an endpoint temperature of 310° C. A second scanning reveals a glass transition temperature of 162.5° C. with further exothermic activity beginning at 319.6° C.

Analysis of a portion of the bis(oxazoline) and diglycidyl ester blend via crosspolarized light microscopy is completed using a microscope equipped with a programmable hot stage using a heating rate of 20° C. per minute and 70× magnification. The following results are obtained:

| Observed Transition Temperature (°C.) | Comments |
| --- | --- |
| 30 | Birefringent solid. |
| 132 | First melting. |
| 140 | Crystals dispersed in isptropic melt. |
| 255 | Clearing of dispersed crystals observed. |
| 265 | Thermosets. |
| 275 | Liquid crystalline textures observed. |

When cooled to room temperature (24° C.), the thermoset product exhibited a high level of birefringent liquid crystalline textures.

Analysis of a second portion of the bis(oxazoline) and diglycidyl ester blend via crosspolarized light microscopy is completed using a microscope equipped with a programmable hot stage preheated to 280° C. and 70× magnification. At this temperature, partial melting with immediate clearing of dispersed crystals occurred. After thirty seconds at 280° C., birefringent domains resembling batonnets appeared. After a total of one minute, thermosetting occurred to provide a solid with a high degree of birefringence and liquid crystalline textures. When cooled to room temperature (24° C.), the thermoset product exhibited dispersed regions possessing liquid crystalline textures.

Analysis of a third portion of the bis(oxazoline) and diglycidyl ester blend via crosspolarized light microscopy is completed using a microscope equipped with a programmable hot stage preheated to 260° C. and 70× magnification. At this temperature, partial melting with immediate clearing of dispersed crystals occurred followed by the appearance of birefringent domains resembling batonnets thirty seconds later. At this time, shear was applied to the resin by moving the glass coverslip in one direction over the top of the resin sample supported on the glass slide. Shearing induced liquid crystalline texture in the entire resin sample with orientation of the birefringent domains perpendicular to the direction that the shear was applied. The resin thermoset forty five seconds after the application of shear. When cooled to room temperature (24° C.), the thermoset product exhibited shear oriented domains and a smectic morphology.

EXAMPLE 7

Preparation and Copolymerization of bis(Oxazoline) and 4,4'-Diaminostilbene Blend A portion (0.0699 gram, 0.00025 oxazoline equivalent) of the bis(oxazoline) formed by coupling of 4,4'-stilbenedicarboxylic acid chloride and 2-(4-hydroxyphenyl)oxazoline from Example 5-B and 4,4'-diaminostilbene (0.0263 gram, 0.00025 —$NH^2$ equivalent) are added to an agate mortar and ground together until a homogeneous powder is formed. A portion (11.5 milligrams) of the bis(oxazoline) and diamine blend is analyzed by differential scanning calorimetry using a heating rate of 10° C. per minute under a stream of nitrogen flowing at 35 cubic centimeters per minute and a temperature range from 30° to 400° C. An exotherm is obtained with an onset temperature of 150.5° C., a maximum at 207.8° C., an endpoint temperature of 231° C. and an enthalpy of 70.7 joules per gram. A second scanning reveals an endotherm with an onset temperature of 315.7° C., a minimum at 343.8° C., an endpoint temperature of 388° C. and an enthalpy of 104.8 joules per gram. Fourier transform infrared spectrophotometric analysis of a potassium bromide pellet of the copolymerization product recovered from this second scan of the differential scanning calorimetry analysis revealed the presence of amide carbonyl stretching at 1649 cm$^{-1}$ with retention of the ethylene C—H out-of-plane deformation at 965 cm$^{-1}$ and the out-of-plane C—H bending vibration at 832 cm$^{-1}$ indicative of para-disubstitution, concurrent with complete disappearance absorbance at 945 cm$^{-1}$ characteristic of the oxazoline ring.

Analysis of a portion of the bis(oxazoline) and diamine blend via crosspolarized light microscopy is completed using a microscope equipped with a programmable hot stage using a heating rate of 20° C. per minute and 70× magnification. The following results are obtained:

| Observed Transition Temperature (°C.) | Comments |
| --- | --- |
| 30 | Birefringent solid. |
| 160 | Slight softening observed. |
| 230 | Solid turns light brown, birefringent, crystalline. |
| 300 | Darkens to reddish brown solid, birefringent. |

When cooled to room temperature (24° C.), the product was birefringent and composed of crystalline domains.

EXAMPLE 8

A. Synthesis of Bismaleimide of 4,4'-Diaminostilbene

Maleic anhydride (14.71 grams, 0.15 mole) and N,N-dimethylforamide (100 milliliters) are added to a reactor and stirred under a nitrogen atmosphere to provide a solution. Cooling commences and once 5° C. is achieved, dropwise addition of a solution of 4,4'-diaminostilbene (15.77 grams, 0.15 —NH$_2$ equivalents) in N,N-dimethylformamide (60 milliliters) begins at a rate so as to maintain a 5° to 7° C. reaction temperature. After thirteen minutes, an orange precipitate forms. After an additional twenty six minutes at 5° to 7° C., all 4,4'-diaminostilbene solution is added to the stirred slurry. After an additional two hours at 5° C. the slurry is allowed to warm to 22° C. over the next forty eight minutes. The resulting slurry is diluted with N,N-dimethylformamide (750 milliliters) then heated to 74° C. on a rotary evaporator to provide a solution. After a total of 80 milliliters of N,N,-dimethylformamide is removed under vacuum while maintaining the 74° C. temperature, the initial formation of crystals is noted. The product is removed from the rotary evaporator then cooled to 25° C. to provide a crystalline slurry. After filtration the product recovered from the N,N-dimethylformamide slurry is washed on the filter with cold N,N-dimethylformamide (50 milliliters). The resultant damp filter cake is recovered and boiled in acetone (500 milliliters) and the resultant slurry cooled to 2° C. then filtered. The product from the filter is added to a porcelain dish and dried in a vacuum oven at 70° C. and 1 mm Hg to a constant weight of 26.87 grams of crystalline, bright yellow orange colored powder. Fourier transform infrared spectrophotometric analysis of a potassium bromide pellet of the product reveals the presence of the expected imide carbonyl stretching at 1702 and 1656 cm$^{-1}$, absorbance at 852 cm$^{-1}$ due to the cyclic imide structure and adjacent to the out-of-plane C—H bending vibration at 839 cm$^{-1}$ indicative of para-disubstitution and the ethylene C—H out-of-plane deformation at 972 cm$^{-1}$. Nuclear magnetic resonance spectroscopy further confirmed the product structure.

B. Preparation and Copolymerization of bis(Oxazoline) and Bismaleimide of 4,4'-Diaminostilbene Blend A portion (0.1446 gram, 0.00091 oxazoline equivalent) of the bis(oxazoline) of the bis(β-chloroethylamide) of 4,4'-stilbenedicarboxylic acid from Example 1-B and the bismaleimide of 4,4'-diaminostilbene (0.1682 gram, 0.00091 maleimide equivalent) are added to a ceramic mortar and ground together until a homogeneous powder is formed. A portion (14.8 milligrams) of the bis(oxazoline) and bismaleimide blend is analyzed by differential scanning calorimetry using a heating rate of 10° C. per minute under a stream of nitrogen flowing at 35 cubic centimeters per minute and a temperature range from 30° to 350° C. A pair of exotherms are obtained with an onset temperature of 216.5° C., maxima at 234.3° and 252.2° C., an endpoint temperature of 296.8° C. and an enthalpy of 47.0 joules per gram. A second scanning reveals an exotherm with an onset temperature of 168.9° C., a maximum at 204.1° C., an endpoint temperature of 274.0° C. and an enthalpy of 5.0 joules per gram. A third scanning reveals a complete lack of thermal events. Analysis of the brown colored, powdery, solid product recovered from the third scan of the differential scanning calorimetry analysis by crosspolarized light microscopy at 70× magnification reveals a high level of birefringence.

Analysis of a portion of the bis(oxazoline) and bismaleimide blend via crosspolarized light microscopy is completed using a microscope equipped with a programmable hot stage using a heating rate of 20° C. per minute and 70× magnification. The following results are obtained:

| Observed Transition Temperature (°C.) | Comments |
| --- | --- |
| 30 | Birefringent solid. |
| 80 | Slight softening observed, highly birefringent, opaque. |
| 230 | Solid fuses to a brown, highly birefringent, opaque solid. |
| 300 | No further change. |

When cooled to room temperature (24° C.), the product was an opaque, brown colored, birefringent solid and possessed liquid crystalline and/or crystalline textures.

EXAMPLE 9

Preparation and Copolymerization of bis(Oxazoline) and Bismaleimide of 4,4'-Diaminostilbene Blend A portion (0.1326 gram, 0.000475 oxazoline equivalent) of the bis(oxazoline) formed by coupling of 4,4'-stilbenedicarboxylic acid chloride and 2-(4-hydroxyphenyl)oxazoline from Example 5-B and the bismaleimide of 4,4'-diaminostilbene (0.0879 gram, 0.000475 maleimide equivalent) are added to an agate mortar and ground together until homogeneous powder is formed. A portion (15.7 milligrams) of the bis(oxazoline) and bismaleimide blend is analyzed by differential scanning calorimetry using a heating rate of 10° C. per minute under a stream of nitrogen flowing at 35 cubic centimeters per minute and a temperature range from 30° to 350° C. An exotherm is obtained with an onset temperature of 229.1° C., a maximum at 248.2° C., an endpoint temperature of 299.8° C. and an enthalpy of 62.4 joules per gram. A second scanning reveals an exotherm with an onset temperature of 191.8° C., a maximum at 215.2° C., an endpoint temperature of 257.8° C. and an enthalpy of less than 2.0 joules per gram and no other thermal events. Analysis of the brown colored, fused, solid product recovered from the second scan of the differential scanning calorimetry analysis by crosspolarized light microscopy at 70× magnification reveals a high level of birefringence.

Analysis of a portion of the bis(oxazoline) and bismaleimide blend via crosspolarized light microscopy is completed using a microscope equipped with a programmable hot stage using a heating rate of 20° C. per minute and 70× magnification. The following results are obtained:

| Observed Transition Temperature (°C.) | Comments |
| --- | --- |
| 30 | Birefringent solid. |
| 80 | Slight softening observed, highly birefringent, opaque. |
| 160 | Further softening observed, highly birefringent, opaque. |
| 230 | Solid fuses to a brown colored, highly birefringent, opaque solid. |
| 300 | No further change. |

When cooled to room temperature (24° C.), the product was an opaque, brown colored, birefringent solid and possessed liquid crystalline and/or crystalline textures.

EXAMPLE 10

Preparation and Copolymerization of bis(Oxazoline) and 4,4'-Stilbenedicarboxylic Acid Blend A portion of (0.2211 gram, 0.00139 oxazoline equivalent) of the bis(oxazoline) of the bis(β-chloroethylamide) of 4,4'-stilbenedicarboxylic acid from Example 1-B and 4,4'-stilbenedicarboxylic acid from Example 1-A (0.1863 gram, 0.00139 —COOH equivalent) are added to a ceramic mortar and ground together until a homogeneous powder is formed. A portion (23.4 milligrams) of the bis(oxazoline) and dicarboxylic acid blend is analyzed by differential scanning calorimetry using a heating rate of 10° C. per minute under a stream of nitrogen flowing at 35 cubic centimeters per minute and a temperature range from 30° to 350° C. An exotherm is obtained with an onset temperature of 229.9° C. and an endpoint temperature of above 350° C. A second scanning reveals an exotherm with an onset temperature of 249.5° C. and an endpoint above 350° C. A third scanning reveals an exotherm with an onset temperature of 265.3° C. and an endpoint above 350° C. Analysis of the brown colored, powdery, solid product recovered from the third scan of the differential scanning calorimetry analysis by crosspolarized light microscopy at 70× magnification reveals a high level of birefringence.

Analysis of a portion of the bis(oxazoline) and dicarboxylic acid blend via crosspolarized light microscopy is completed using a microscope equipped with a programmable hot stage using a heating rate of 20° C. per minute and 70× magnification. The following results are obtained:

| Observed Transition Temperature (°C.) | Comments |
| --- | --- |
| 30 | Birefringent solid. |
| 120 | Slight softening observed. |
| 230 | Solid fuses to a light brown colored, birefringent, opaque solid. |
| 270 | Opaque, powdery, birefringent solid. |
| 300 | Light brown colored, partially fused, birefringent solid. |

When cooled to room temperature (24° C.), the product was a light brown colored, opaque, highly birefringent solid and possessed liquid crystalline and/or crystalline textures.

EXAMPLE 11

Preparation and Copolymerization of bis(Oxazoline) and 4,4'-Stilbenedicarboxylic Acid A portion (0.1981 gram, 0.000709 oxazoline equivalent) of the bis(oxazoline) formed by coupling of 4,4'-stilbenedicarboxylic acid chloride and 2-(4-hydroxyphenyl)oxazoline from Example 5-B and 4,4'-stilbenedicarboxylic acid from Example 1-A (0.0951 gram, 0.000709 —COOH equivalent) are added to an agate mortar and ground together until homogeneous powder is formed. A portion (15.0 milligrams) of the bis(oxazoline) and dicarboxylic acid blend is analyzed by differential scanning calorimetry using a heating rate of 10° C. per minute under a stream of nitrogen flowing at 35 cubic centimeters per minute and a temperature range from 30° to 350° C. An exotherm is obtained with an onset temperature of 265.0° C., a maximum at 287.0° C., an endpoint temperature of 303.2° C. and an enthalpy of 17.1 joules per gram. This exotherm is immediately followed by a sharp endothermic shift. A second scanning reveals an endotherm with an onset temperature of 296.3° C., followed by exothermic activity with an onset temperature of 332.7° C. (decomposition). Analysis of the semi-translucent, brown colored, fused, solid product recovered from the second scan of the differential scanning calorimetry analysis by crosspolarized light microscopy at 70× magnification reveals a high level of birefringence.

Analysis of a portion of the bis(oxazoline) and dicarboxylic acid blend via crosspolarized light microscopy is completed using a microscope equipped with a programmable hot stage using a heating rate of 20° C. per minute and 70× magnification. The following results are obtained:

| Observed Transition Temperature (°C.) | Comments |
| --- | --- |
| 30 | Birefringent solid. |
| 240 | Slight softening observed. |
| 279 | Some fusion to a light brown colored, birefringent solid observed. |
| 300 | Fused light brown colored, birefringent solid, partial melt flow observed. |

When cooled to room temperature (24° C.), the product was an opaque, light brown colored, fused, highly birefringent solid and possessed liquid crystalline and/or crystalline textures.

What is claimed is:

1. A cyclic imino ether containing one or more rodlike mesogenic moieties and one or two terminal groups of the formula:

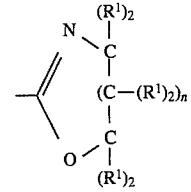

wherein $R^1$ is independently hydrogen or hydrocarbyl group having 1 to about 3 carbon atoms and n has a value of 0 or 1; said cyclic imino ether not including the following:

2-(4-(4-methoxy-4'-biphenyloxy)butyl)-2-oxazoline, 2-(6-(4-methoxy-4'-methoxy-4'-biphenyloxy)butyl)-2-oxazoline, 2-(4-(4 -phenylphenoxy)butyl)-2-oxazoline, 2,2'-(1,1'-biphenyl)-4,4'-diylbis(4, 5 -dihydro)oxazole or compounds represented by the following formula:

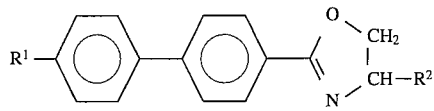

wherein $R^1$ represents an alkoxy group having not more than 20 carbon atoms and $R^2$ represents an alkyl group having from 1 to 8 carbon atoms, or said not included compounds which are substituted at one or more sites on their aromatic rings by hydrocarbyl of 1 to 10 carbons, hydrocarbyloxy of 1 to 10 carbons, a phenyl group, halogen, nitro, nitrile or —COR, where R is hydrogen or hydrocarbyl of 1 to 3 carbon atoms.

2. A cyclic imino ether of claim 1 represented by any one of the following Formulas I, II, III or IV direct bond in Formula III and the Y groups are in the para position with respect to each other; each Y is independently a direct bond, $—CO—S—(C(R^1)_2)_{n''}—Im$, $—CO—NR^1—(C(R^1)_2)_{n''}—Im$, $—CO—O—C(R^1)_2—(C(R^1)_2)_{n''}—Im$, $—(Q)_n—C(R^1)_2—(C(R^1)_2)_{n''}—Im$, $—HN—CO—O—C(R^1)_2—(C(R^1)_2)_{n''}—Im$, $—(Q)_n—C(R^1)_2—(C(R^1)_2)_{n''}—(O—C(R^1)_2—(C(R^1)_2—)_p—(Q^1)_n—$, $—O—C(R^1)_2—(C(R^1)_2—)_{n''}—Im$

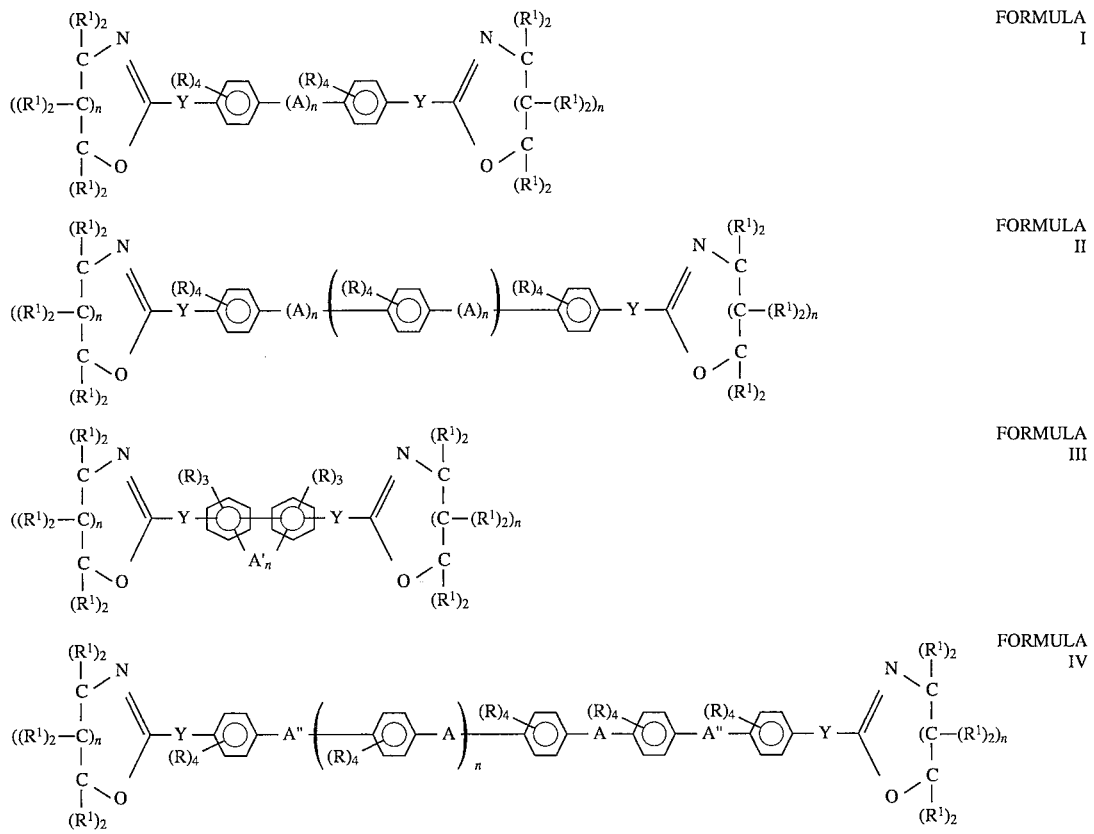

wherein at least about 80 percent of the —A— linkages, the

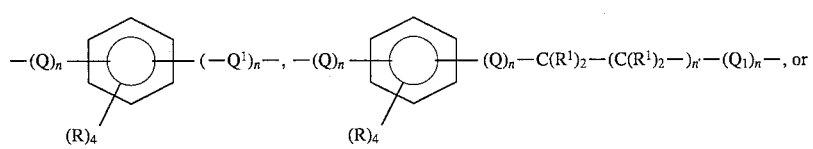

-continued

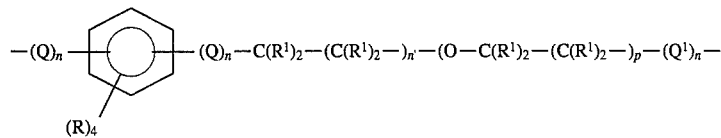

group;
each Q is independently a —O—CO—O—, —O—CO—, —CO—O—, —O—, —S—, —NR², —CO—NR¹—, —NR¹—CO—, —NH—CO—NH—, —O—CO—NH—, —NH—CO—O—, —S—CO—, —CO—S—, or —CO— group; each $Q^1$ is independently —CO—S—$(C(R^1)_2)_{n''}$—Im, —CO—NR¹—$(C(R^1)_2)_{n''}$—Im, —CO—O—$C(R^1)_2$—$(C(R^1)_2)_{n''}$—Im, —NH—CO—O—$C(R^1)_2$—$(C(R^1)_2)_{n''}$—Im, or —O—$C(R^1)_2$—$(C(R^1)_2)_{n''}$—Im; each $R^2$ is independently a hydrocarbyl group having from 1 to about 10 carbon atoms; each A is independently a direct bond, —CR¹=CR¹—, —C≡C—, —N=N—, —CR¹=N—, —O—CO—, —NR¹—CO—, CR¹=N—N=CR¹—, —CR¹=CR¹—CO—, —CO—O—, —CO—NR¹—, —CO—CR¹=CR¹—, —CR¹=CR¹—O—CO—(CH₂)n'—, —N=CR¹—, —(CH₂)n'—CO—O—CR¹=CR¹—, —CR¹=CR¹—O—CO—, —CO—O—CR¹=CR¹—, —CO—O—N=CR¹—, —CR¹=N—O—CO—, —CR¹=CR¹—CO—O—, —CO—S—, —O—CO—CR¹=CR¹—, —CR¹=CR¹—CO—O—(CH₂)ₙ'—, —S—CO—, —(CH₂)ₙ'—O—CO—CR¹=CR¹—, —CHR¹—CHR¹—CO—O—, —O—CO—CHR¹—CHR¹—, —C≡C—C≡C—, —CR¹=CR¹—CR¹=CR¹—, —CO—NR¹—NR¹—CO—,

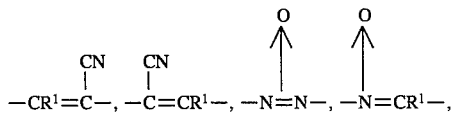

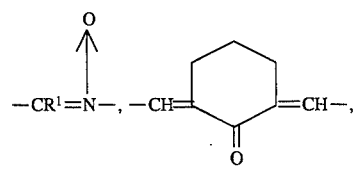

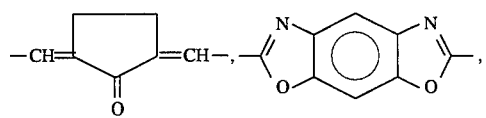

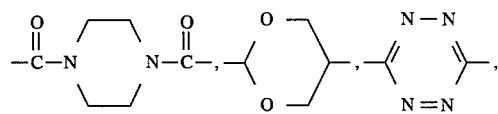

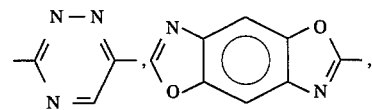

-continued

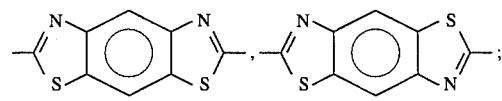

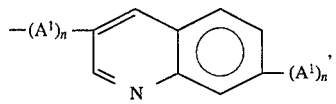

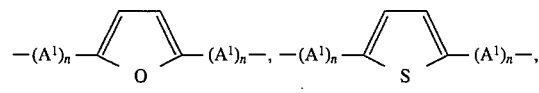

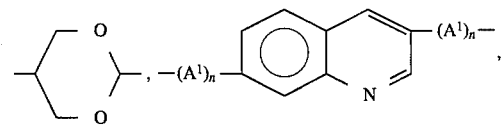

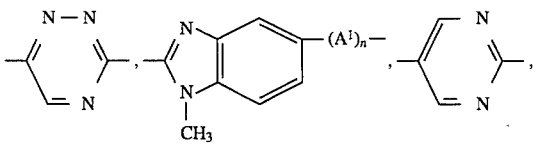

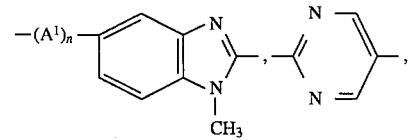

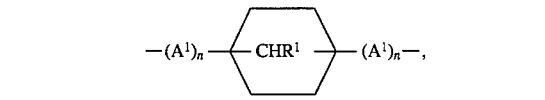

-continued

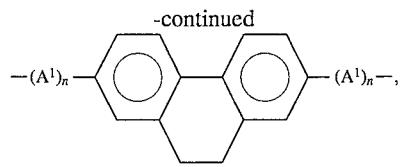

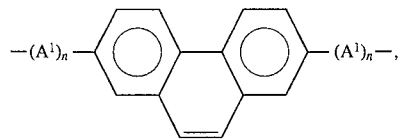

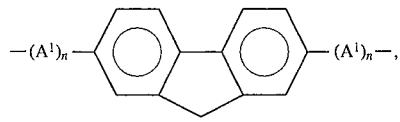

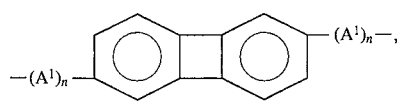

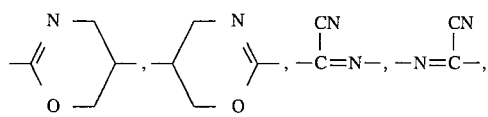

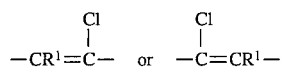

each A' is independently a divalent hydrocarbyl group having from 1 to about 10 carbon atoms; each A" is independently an alkylene group having from 1 to about 10 carbon atoms, a direct bond, —O—, —CO—, —S—, —S—S—, —SO—, —SO$_2$— or —O—CO—O—; each A$^1$ is independently a —CO—, —O—CO—, —CO—O—, —CO—NR$^1$—, or —NR$^1$—CO— group; each R is independently hydrogen or a hydrocarbyl or hydrocarbyloxy group having from 1 to about 10 carbon atoms, a halogen atom, a nitro group, a nitrile group, a phenyl group or a —CO—R$^1$ group; each R$^1$ is independently hydrogen or a hydrocarbyl group having 1 to about 3 carbon atoms; n has a value of zero or one; n' has a value from 1 to about 6; a has a value of one or two; n" has a value from zero to about 6; p has a value from 1 to about 30; and wherein Im denotes the position to which the cyclic imino ether ring is attached; and wherein the aromatic rings can also contain one or more heteroatoms selected from N, O, or S.

3. A cyclic imino ether of claim 2 wherein said cyclic imino ether is

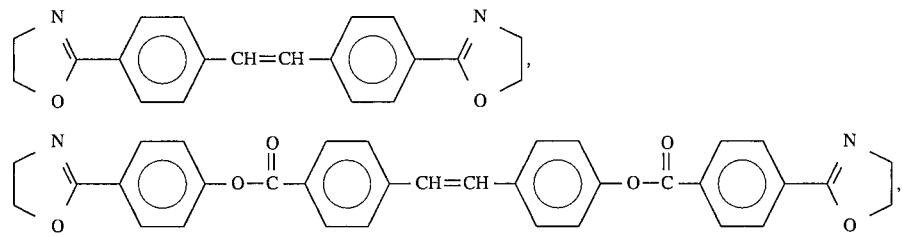

or a mixture thereof.

* * * * *